(12) United States Patent
Coady et al.

(10) Patent No.: US 7,940,667 B1
(45) Date of Patent: May 10, 2011

(54) DELAY MEASUREMENTS AND CALIBRATION METHODS AND APPARATUS FOR DISTRIBUTED WIRELESS SYSTEMS

(75) Inventors: Alan Coady, Kanata (CA); Zixiong Wang, Kanata (CA)

(73) Assignee: PMC-Sierra US, Inc., Sunnyvale, CA (US)

(*) Notice: Subject to any disclaimer, the term of this patent is extended or adjusted under 35 U.S.C. 154(b) by 811 days.

(21) Appl. No.: 11/829,403

(22) Filed: Jul. 27, 2007

Related U.S. Application Data

(60) Provisional application No. 60/825,532, filed on Sep. 13, 2006.

(51) Int. Cl.
*G01S 13/00* (2006.01)

(52) U.S. Cl. .......... 370/238; 370/229; 370/235; 342/72; 342/102; 342/103

(58) Field of Classification Search ............... 455/67.11, 455/67.16, 226.1, 39; 370/238, 235, 229; 342/73, 89, 98, 102–103
See application file for complete search history.

(56) References Cited

U.S. PATENT DOCUMENTS

| | | | |
|---|---|---|---|
| 6,826,247 B1 * | 11/2004 | Elliott et al. ................ | 375/376 |
| 6,882,159 B1 * | 4/2005 | Cowan et al. ................ | 324/537 |
| 6,943,834 B1 * | 9/2005 | Hirai ............................ | 348/231.6 |
| 7,161,398 B2 * | 1/2007 | Park et al. .................... | 327/149 |
| 7,742,553 B1 * | 6/2010 | Bataineh et al. ............. | 375/376 |
| 2002/0097813 A1 * | 7/2002 | Vaidyanathan ............... | 375/326 |
| 2005/0078783 A1 * | 4/2005 | Okita ............................ | 375/376 |
| 2006/0203602 A1 * | 9/2006 | Best et al. .................... | 365/233 |
| 2006/0251195 A1 * | 11/2006 | Chen et al. ................... | 375/348 |
| 2007/0046344 A1 * | 3/2007 | Minzoni ....................... | 327/158 |
| 2007/0075877 A1 * | 4/2007 | Goller et al. ................. | 341/50 |

* cited by examiner

*Primary Examiner* — William Trost, IV
*Assistant Examiner* — Charles C Jiang
(74) *Attorney, Agent, or Firm* — Curtis B. Behmann; Borden Ladner Gervais LLP

(57) ABSTRACT

Delay measurement and delay calibration methods and apparatus are described for use within distributed wireless base stations employing a remote radio head topology. The methods and apparatus are usable in any system that requires accurate delay measurement and/or constant delay through an electronic device. The methods and apparatus for measuring delay embody a highly accurate distributed delay measurement architecture that handles multiple delay paths within distributed wireless base stations employing a remote radio head topology. The method and apparatus are amenable to implementation with current integrated circuit technology. The methods and apparatus for calibrating electronic delay within distributed base stations employing a remote radio head topology are useful for implementing distributed wireless base stations where transmit diversity is desired. Using the methods disclosed herein, delay within a distributed wireless base station can be measured and calibrated to achieve very deterministic delay characteristics at the system level.

24 Claims, 23 Drawing Sheets

DELAY MEASUREMENTS AND CALIBRATION METHODS AND APPARATUS FOR DISTRIBUTED WIRELESS SYSTEMS

CROSS REFERENCE TO RELATED APPLICATIONS

This application claims priority from U.S. Provisional Patent Application Ser. No. 60/825,532, filed on Sep. 13, 2006, which is herein incorporated by reference.

FIELD OF THE INVENTION

This invention is applicable to delay measurement and delay calibration within distributed wireless base stations employing a remote radio head topology. It can be used in any system that requires accurate delay measurement and/or constant delay through an electronic device.

BACKGROUND OF THE INVENTION

In traditional wireless systems, including both second generation and third generation base stations, backhaul transport and baseband processing components are physically co-located with radio frequency processing components in a radio tower. This has not only driven up system maintenance costs, but also resulted in a rigid system that is difficult to adapt to quickly evolving radio standards. Recent innovations in wireless access networks have led to the introduction of distributed base stations and Remote Radio Heads (RRH). In this new architecture, centrally located base station "hotels" are used for backhaul transport and baseband processing, and they are remotely located from the radio towers. Very low loss optical fiber is then used to connect base station hotels with remote radio units. This distributed architecture promises to dramatically reduce costs associated with site acquisition, site leasing, and energy consumption for wireless systems.

Two competing open standards have been proposed by wireless industry to facilitate rapid adaptation of the remote radio head architecture: one is the Common Public Radio Initiative (CPRI) specification, the other is the Open Base Station Architecture Initiative (OBSAI) specification. Both standards allow flexible remote radio head topology, such as point-to-point, chain, ring, and tree. These different RRH topologies supported by CPRI are shown in FIG. 1. Such topologies have evolved to support multiple radio protocols, such as WCDMA, CDMA2000, and WiMax, etc. As new radio protocols emerge, these standards will be enhanced to embrace them to exploit the promised potential of the remote radio head architecture.

The RRH architecture also brings new design challenges for component providers. Chief among them is delay measurement and delay calibration from base station hotels to remote radio heads. The stringent requirements on delay measurement and delay calibration are driven from high-level system requirements. For example, third generation WCDMA systems require the air-frame timing among different antennas to be synchronized. When these antennas are arranged into RRHs through a chain or tree topology, fiber delay through CPRI/OBSAI links must be measured, and air-frames to each RRH must be aligned through delay calibration. Other system requirements such as location based service and transmission diversity also drive the required accuracy for delay measurement and calibration. For reduced system cost, it is highly desirable to have integrated solutions for the required delay measurement and calibration over CPRI/OBSAI links.

Both CPRI and OBSAI have defined delay measurement and calibration requirements over CPRI/OBSAI links for wireless systems employing RRH architecture. For clarity, the following discussion focuses on CPRI only, though the principles apply equally to OBSAI. In order to be compliant with high-level system requirements on user equipment positioning, CPRI requires that the full path round-trip delay measurement to have an accuracy of $\pm Tc/16$, where Tc is the WCDMA chip period of 260.41 ns. Given that there are potentially multi hops in an end-to-end path in a chain or tree topology, and delay measurement errors accumulate with hop counts, this requires an integrated device to support delay measurement in the nanosecond range.

FIG. 2 shows the required delay measurement paths for a CPRI device in a chain topology. In addition, a CPRI device must also measure the external cable round trip delay from output port 5 to input port 4. The specific delay path measurements shown include: $\Delta_{1,2}$ and $\Delta_{4,5}$ which are the loop-back (digital) delay; $\Delta_{3,2}$ and $\Delta_{3,5}$ which are the add path (RF & digital) delay; $\Delta_{1,3}$ and $\Delta_{4,3}$ which are the drop path (RF & digital) delay; $\Delta_{1,5}$ which are the transmit signal (digital) through-path propagation delay; $\Delta_{4,2}$ which are the receive signal (digital) through-path propagation delay. Accordingly, there are a total of 9 delay paths to be measured for a CPRI device supporting chain topology. FIG. 3 shows a conceptual block diagram of a typical Nth CPRI device in such chain topology. For a CPRI device supporting tree topology with multiple CPRI links, the total number of delay paths can grow significantly. This large number of delay paths and the high measurement accuracy required present a challenging delay measurement design problem for creators of integrated CPRI devices.

In order to be compliant with high-level system requirements for transmit diversity and user equipment positioning, CPRI also requires that link delay excluding cable length to be accurate within $\pm Tc/32$. In a typical implementation, the following factors contribute to device delay uncertainty: metastability effects when crossing asynchronous clock domains; phase uncertainty of recovered clocks from Serializer-Deserializer (SERDES) receivers; phase uncertainty of divided clocks; and delay variation over process, voltage, and temperature (PVT).

In general, delay uncertainties can be categorized into static uncertainty and dynamic uncertainty. Here, metastability effects and phase uncertainty of recovered clocks are un-predicable upon chip startup. However, with appropriate circuitry their contribution to device data-path delay can become fixed after system initialization and therefore will not change over time such that they can be considered to contribute to static uncertainty. On the other hand, delay variation over voltage and temperature changes over time contributes to dynamic uncertainty. Addressing both types of delays is therefore desirable.

SUMMARY OF THE INVENTION

The present inventive delay measurement methods are important to achieve high delay measurement accuracy for distributed wireless systems. The present inventive delay calibration methods are important to achieve constant delay required for distributed wireless systems supporting transmit diversity. Distributed wireless systems using RRH topology promise to reduce significant maintenance costs, and can be employed through CPRI, OBSAI, or proprietary interfaces. The present invention is useful for a wide variety of radio protocols and important for emerging wireless access networks (e.g., WCDMA, CDMA2000, WiMax, GSM, TD-SCDMA, or DVB-H, etc) which employ distributed base stations and Remote Radio Heads. Implementation of the present invention within such distributed architectures can dramatically reduce costs associated with site acquisition, site leasing, and energy consumption for wireless systems.

In representative embodiments, a method is provided for measuring a delay in a distributed wireless system, the method including: selecting two reference frame pulses from a group of frame pulses; performing coarse grain measurement to obtain a coarse grain delay between the two reference frame pulses; performing fine grain measurement to obtain a phase offset between the two reference frame pulses; calculating a total delay between the two reference frame pulses using the coarse grain delay and the phase offset; and wherein the total delay corresponds to the delay in the distributed wireless system.

In representative embodiments, an apparatus is provided for measuring a delay in a distributed wireless system, the apparatus including: a first set of frame pulse and phase detectors (FPPDs) for obtaining a first reference frame pulse; a second set of FPPDs for obtaining a second reference frame pulse; a delay line coupled to, and shared among, the first and second sets of FPPDs; a coarse grain finite state machine coupled to each the FPPD to obtain a coarse grain delay between the first and the second reference frame pulses; a fine grain finite state machine coupled to each the FPPD and the delay line to obtain a phase offset between the first and the second reference frame pulses; and wherein the delay in the distributed wireless system is determined by the fine grain finite state machine in conjunction with the coarse grain finite state machine.

In representative embodiments, a method is provided of compensating for delay in a distributed wireless system, the method including: calculating a FIFO delay introduced by a first-in-first-out (FIFO) circuit used in a datapath between a writer and a reader, the calculating of the FIFO delay including selecting a write frame pulse and a read frame pulse from a group of FIFO frame pulses, performing coarse grain measurement to obtain a coarse grain delay between the write and read frame pulses, performing fine grain measurement to obtain a phase offset between the write and read frame pulses, and calculating the FIFO delay between the write and read frame pulses using the coarse grain delay and the phase offset; and upon reaching a predetermined threshold of the FIFO delay, stalling subsequent read frame pulses of the FIFO by a fixed increment corresponding to the FIFO delay.

In representative embodiments, an apparatus is provided for delay compensation in a distributed wireless system, the apparatus including: a first-in-first-out (FIFO) circuit used in a datapath between a writer and a reader; a first set of frame pulse and phase detectors (FPPDs) for obtaining a write frame pulse; a second set of FPPDs for obtaining a read frame pulse; a delay line coupled to, and shared among, the first and second sets of FPPDs; a coarse grain finite state machine coupled to each FPPD to obtain a coarse grain delay between the write and read frame pulses; a fine grain finite state machine coupled to each FPPD and the delay line to obtain a phase offset between the write and read frame pulses, where FIFO delay is determined by the fine grain finite state machine in conjunction with the coarse grain finite state machine; each the FPPD including a phase detection circuit coupled to the delay line and the fine grain finite state machine, and a frame pulse detection circuit coupled to the coarse grain finite state machine; and a pulse generator for stalling subsequent read frame pulses of the FIFO by a fixed increment corresponding to the FIFO delay upon reaching a predetermined threshold of the FIFO delay.

In representative embodiments, a method is provided of compensating for clock phase uncertainty in a distributed wireless system, the method including: searching for an 8B/10B comma character over a 19-bit sliding window in an 8B/10B decoder; and upon identification of the 8B/10B comma character, shifting alignment of a receiver so as to synchronize with the 8B/10B characters.

In representative embodiments, an apparatus is provided for compensation of clock phase uncertainty in a distributed wireless system, the apparatus including: a serializer-deserializer (SERDES) receiver including a data and clock recovery unit (DCRU) coupled to a high-speed serial-in-parallel-out (SIPO) circuit; a phase-adjustable clock divider coupled between the DCRU and the SIPO; a 1-bit barrel shifter coupled to the SIPO; an 8B/10B decoder coupled to a receiver data output of the 1-bit barrel shifter and a receiver clock output of the phase-adjustable clock divider; a framer coupled to an output of the 8B/10B decoder; and whereupon identification of an 8B/10B comma character over a search of a 19-bit sliding window causes shifting alignment of the SERDES receiver so as to synchronize with the 8B/10B characters.

In representative embodiments, a method is provided of compensating for voltage and temperature effects in a distributed wireless system, the method including: providing a first delay line, a second delay line, and a third delay line within a jitter-attenuator (JAT), the JAT being coupled to a serializer-deserializer (SERDES) receiver and a SERDES transmitter; setting the first delay line to correspond to delay of the SERDES receiver plus JAT clock pad delay; setting the second delay line to correspond to delay of the SERDES transmitter minus the JAT clock pad delay; setting the third delay line to correspond to delay of the JAT clock period minus the SERDES transmitter delay minus the SERDES receiver delay; and wherein the first, second, and third delay lines are operatively coupled to ensure overall delay from an input of the SERDES receiver to an output of the SERDES transmitter remains constant over temperature and voltage variations.

In representative embodiments, an apparatus is provided for compensation of voltage and temperature effects in a distributed wireless system, the apparatus including: a clock synthesizing unit (CSU) coupled between a serializer-deserializer (SERDES) receiver and a SERDES transmitter; a jitter-attenuator (JAT) obtaining a receiver clock signal from the SERDES receiver and providing a reference clock signal to the CSU, the JAT including a serially coupled phase detector, loop filter, charge pump, and voltage controlled crystal oscillator (VCXO), the JAT including a first delay line coupled between a pad of the JAT and the phase detector, a second delay line coupled between the pad and the reference clock signal; and a third delay line coupled between the reference clock signal and the VCXO; and wherein the first delay line is set to correspond to delay of the SERDES receiver plus JAT clock pad delay, the second delay line is set to correspond to delay of the SERDES transmitter minus the JAT clock pad delay, the third delay line is set to correspond to delay of the JAT clock period minus the SERDES transmitter delay minus the SERDES receiver delay, and the first, second, and third delay lines are operatively coupled to ensure overall delay from an input of the SERDES receiver to an output of the SERDES transmitter remains constant over temperature and voltage variations.

Other aspects and advantages of the present invention will become apparent from the following detailed description, taken in conjunction with the accompanying drawings, illustrating by way of example the principles of the invention.

BRIEF DESCRIPTION OF THE DRAWINGS

Embodiments of the present invention will now be described, by way of example only, with reference to the attached figures, wherein.

DETAILED DESCRIPTION

Generally, the present invention provides methods and apparatus for measuring the delay experienced by user data as it traverses a distributed wireless system. The present invention also provides methods and apparatus for calibrating delay introduced by wireless systems. The delay measurement methods and apparatus for distributed wireless systems in accordance with the present invention serve to measure delay experienced by user data as it traverses a distributed wireless system. Such delay addressed by the present invention is divided into three areas: 1) round trip delay within a wireless access network, 2) delay introduced by a SERDES subsystem, and 3) delay introduced by the arbitrary alignment of the receive logic of a SERDES subsystem.

Delay measurement using a distributed architecture is accomplished in the present invention by way of a method for measuring the delay between two selected frame pulses. The frame pulses can be individually chosen from a larger group of frame pulses co-existing on a device. Two levels of accuracy of delay measurement are included and involve coarse grain and fine grain. It should be understood that while a distributed approach is discussed for acquiring occurrence of a frame pulse, the present inventive methods may be used in-conjunction with a co-located approach without straying from the intended scope of the present invention. For clarity, only one embodiment will be detailed. Those familiar with the subject will recognize this function could be realized in many different ways. For purpose of explanation, a six-link embodiment will be described with 32 frame pulse sources as an example. This leads to a possible 496 (summation of N, where N is 0 to 31) independent delay measurements. However, this embodiment imposes no limitation on the number of links or frame pulse sources.

For a device of a six-link embodiment, it may be useful to instantiate six real-time coarse grain delay calculators which run concurrently with one another. These delay calculators can be statically provisioned to measure the delay between any pair of the 32 input reference frame pulses. Selecting the frame pulses associated with the six links would allow a continuous coarse grain measurement for each of the links to occur simultaneously. Because coarse grain delay measurement does not provide enough accuracy, fine grain delay measurement is also provided. For this example one fine grain calculator is instantiated.

Figure 1:
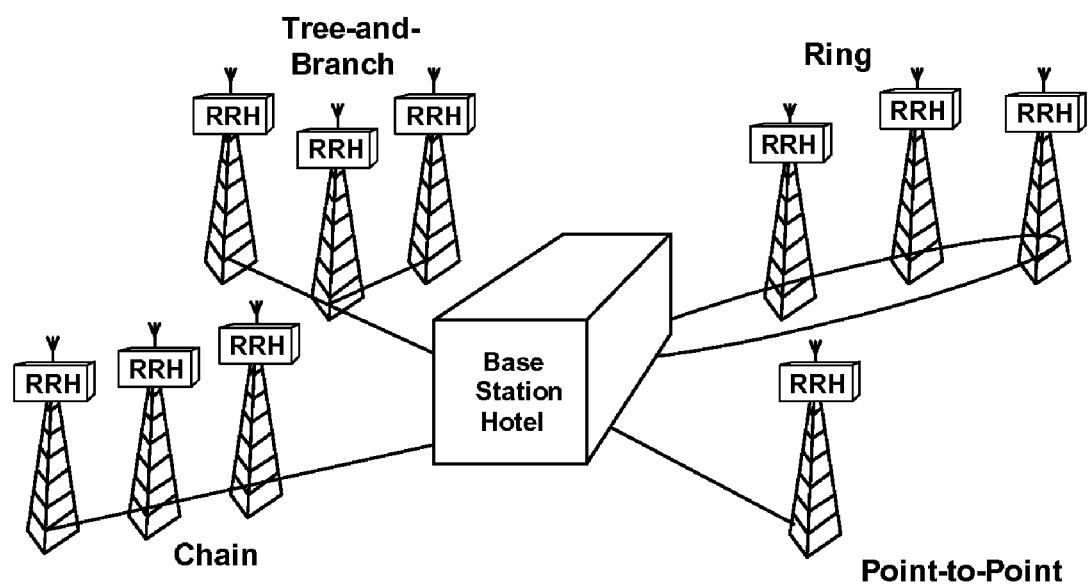
FIG. 1 shows typical RRH topologies.
Figure 2:
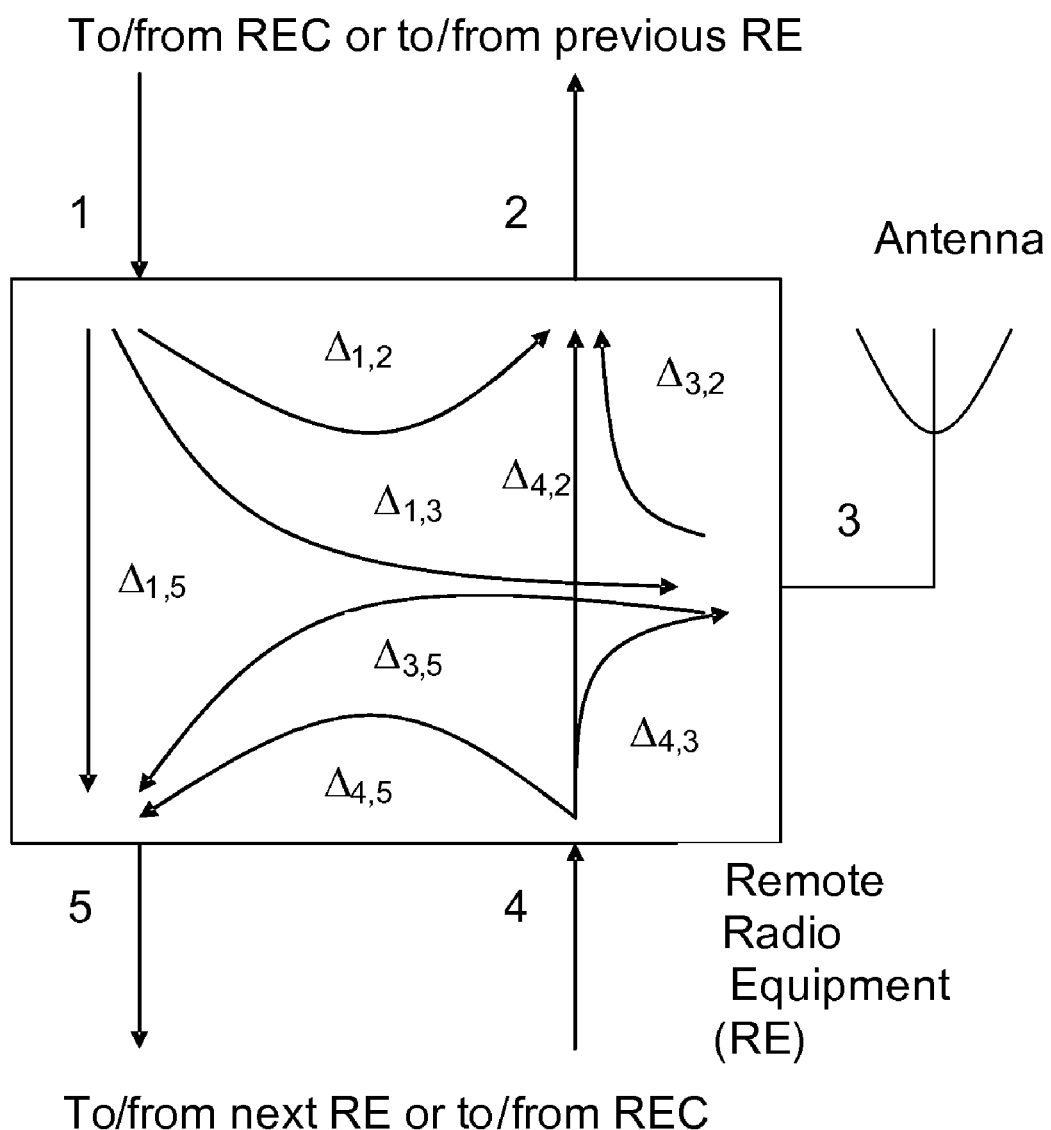
FIG. 2 shows typical internal delay paths in a CPRI device supporting chaining topology.
Figure 3:
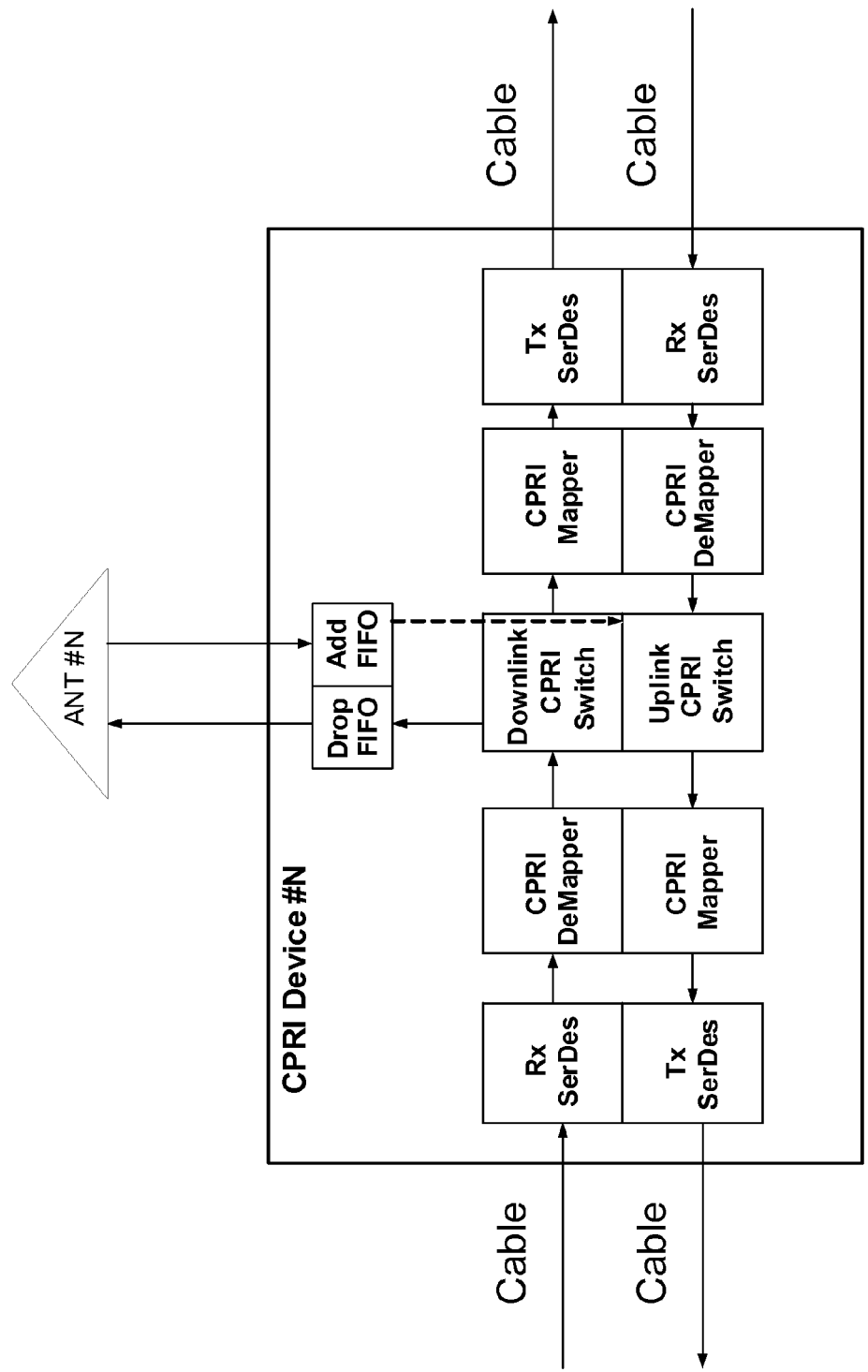
FIG. 3 shows a conceptual block diagram of an Nth typical CPRI device in a chain topology.
Figure 4:
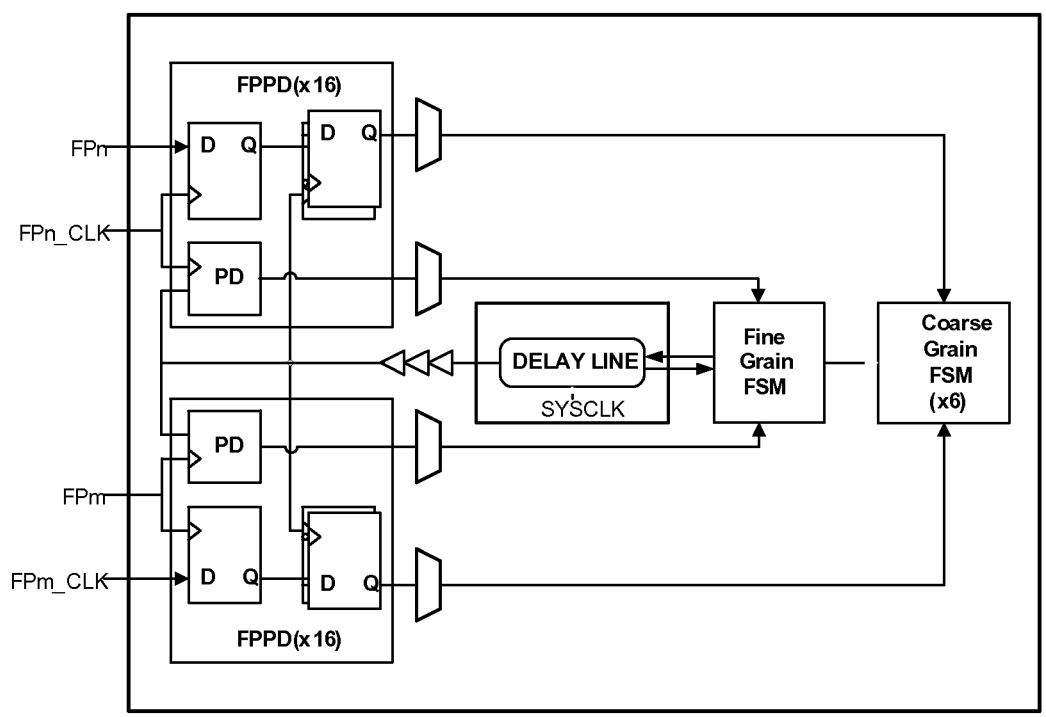
FIG. 4 shows a delay calculation block diagram in accordance with the present invention.

A logical block diagram of the delay calculation embodiment is depicted in FIG. 4 showing four main components: thirty-two Frame Pulse and Phase Detectors (FPPD), one delay line subsystem (DL), one Fine Grain Finite State Machine (FG_FSM), and six Coarse Grain Finite State Machines (CG_FSM). Here, CG_FSMs control coarse grain delay measurement, while the FG_FSM controls fine grain delay measurement with the help of 32 distributed FPPDs.

Figure 5:
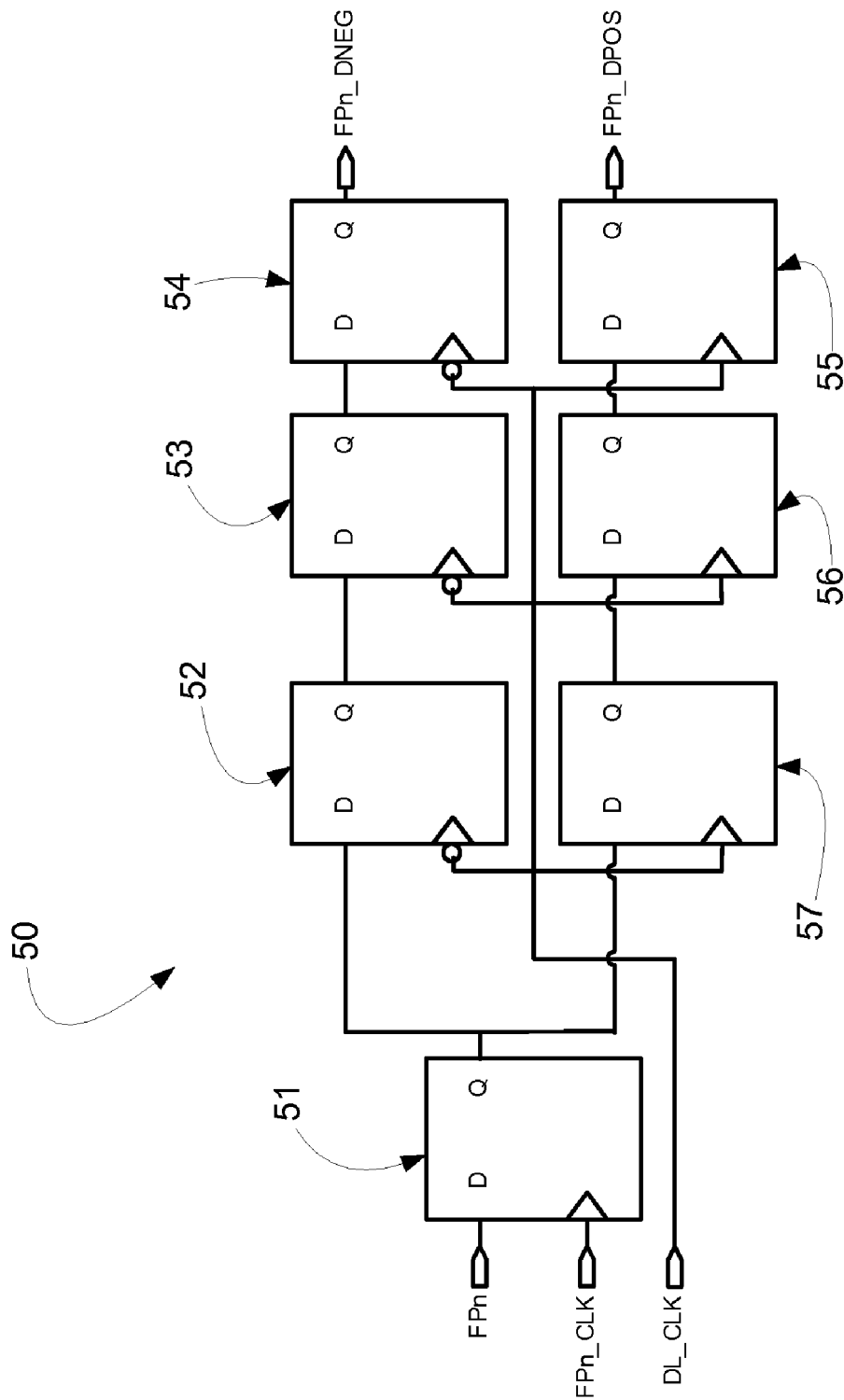
FIG. 5 shows a frame pulse detector in accordance with the present invention.

Generally speaking, coarse grain delay is measured in the present invention by counting the number of half Delay Line Clock (DL_CLK) clock periods between two selected reference frame pulses. This is achieved by sampling each reference frame pulse on both the rising and falling edges of DL_CLK. The result is used to compute the delay. The frame pulses are considered to be asynchronous to each other and to the DL_CLK clock, hence, the frame pulses are sampled and retimed to the DL_CLK clock domain. This retiming contributes to one-half DL_CLK clock cycle of uncertainty on the capture of each frame pulse. Process, voltage, and temperature (PVT) physical effects also add to the uncertainty of the coarse grain delay measurement. The uncertainty of the retiming of the two frame pulses and the setup and hold requirements of the retiming flops leads to a total uncertainty in the delay measurement of slightly more than one DL_CLK period. The exact amount of the uncertainty is dependant on the physical implementation of the circuit. FIG. 5 illustrates a frame pulse detection circuit 50 that can be used to provide this edge sampling. This circuit 50 would be instantiated once for each frame pulse source, with the Frame Pulse n (FPn) signal tied to the D input of the first flop 51, where n refers to the specific frame pulse source out of the group of possible frame pulse sources (i.e., thirty-two for this example). This flop 51 is clocked by the clock associated with frame pulse n, Frame Pulse n Clock (FPn_CLK). The output of this first flop 51 is then provided as the input to downstream flops 52-57 that are clocked by the falling and rising edges of DL_CLK, respectively. Outputs of this circuit 50 are Frame Pulse n Detected on the Negative Edge of Delay Line Clock (FPn_D-NEG) and Frame Pulse n Detected on the Positive Edge of Delay Line Clock (FPn_DPOS). Details of frame pulse detection are further described hereinbelow with regard to the frame pulse and phase detector subsystem.

Figure 6:
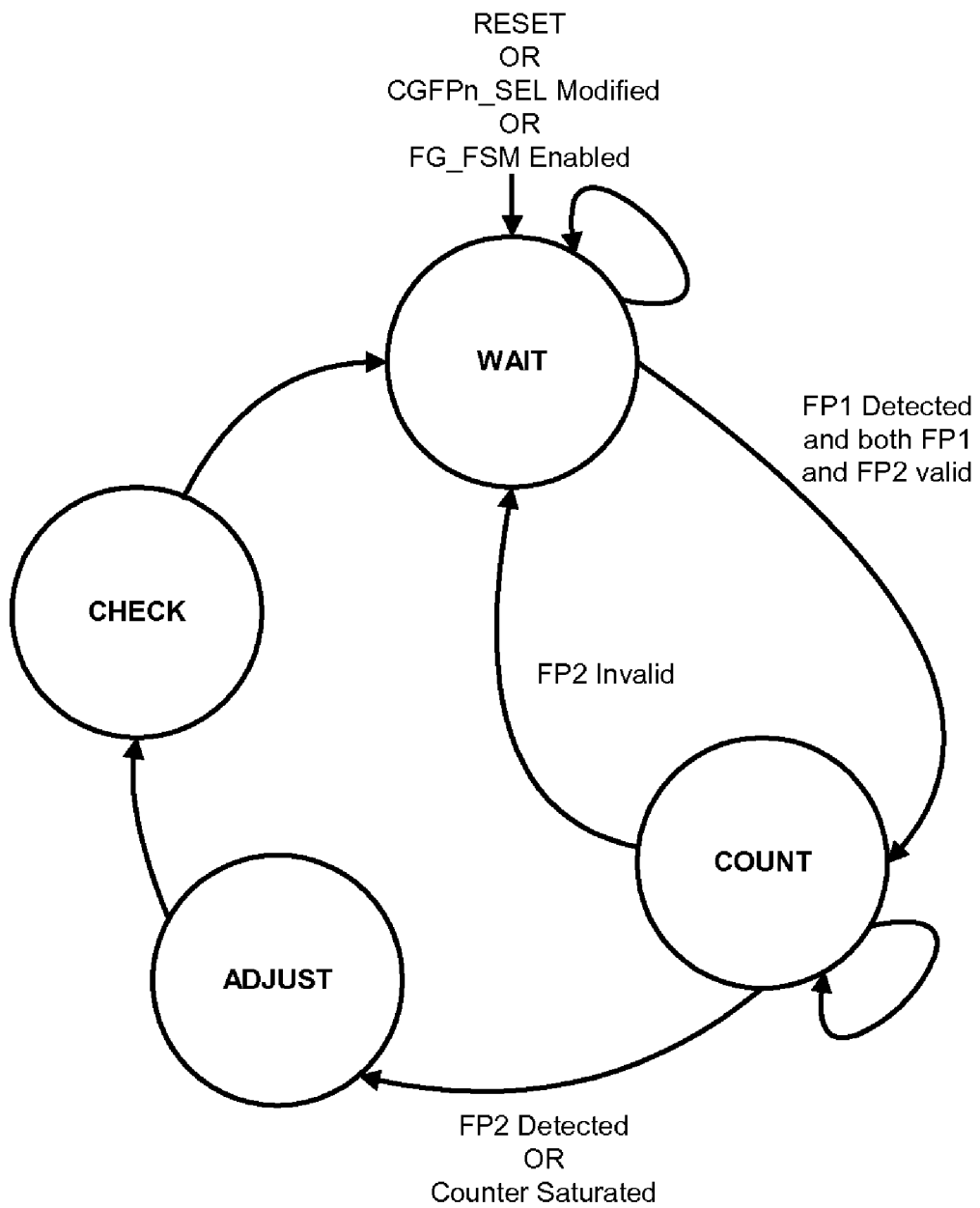
FIG. 6 shows a coarse grain Finite State Machine (FSM) in accordance with the present invention.

The Coarse Grain Finite State Machine (CG_FSM) depicted in FIG. 6 is implemented to perform coarse grain delay measurements. Again, this is only one way to realize this disclosed function and is provided for illustrative purposes only. The thirty-two reference frame pulses are inputs to the CG_FSM, of which any two can be selected to undergo a delay measurement. There could be multiple Coarse Grain Finite State Machines instantiated in a given device. For purpose of explanation one selected frame pulse input is identified by the value stored in a Coarse Grain Frame Pulse One Selection (CGFP1_SEL) storage element. The second frame pulse input is identified by the value stored in CGFP2_SEL.

During system reset, the CG_FSM enters the WAIT state. In this state, the FSM waits for the two input frame pulses identified in storages elements CGFP1_SEL and CGFP2_SEL to be validated by external logic. For explanation purposes these two frame pulses are labeled Frame Pulse One (FP1) and FP2. Once both signals are indicated valid, the FSM then waits for the assertion of either FP1_DNEG or FP1_DPOS from the frame pulse detection circuit. Upon assertion, the FSM initializes a delay counter and transitions to the COUNT state. The WAIT state will be re-entered if either the CGFP1_SEL or CGFP2_SEL are modified or if the Fine Grain Finite State Machine (FG_FSM) is enabled. During fine grain delay measurements the DL_CLK is shifted in time and this may diminish the accuracy of a coarse grain measurement by the CG_FSM. For this reason, and the fact that a fine grain delay measurement is more accurate than a coarse grain measurement, the CG_FSM is held in the WAIT state whenever a fine grain delay measurement is underway.

In the COUNT state, the Coarse Grain Delay Counter (CGDC) is incremented twice per DL clock cycle until the second frame pulse in the pair is detected. When either FP2_DNEG or FP2_DPOS is asserted, the delay counter is frozen, and the state machine transitions to the AJUST state. If FP2 is not detected before the counter saturates the FSM transitions to the AJUST state.

In the AJUST state, the FSM calculates a delay adjustment based on the edges that two frame pulses were detected on. If both frame pulses are captured on the same edge (either positive or negative), no adjustment is made. If the AJUST state is entered due to a delay counter overflow, no adjustment is made. However, if FP1 is captured on the rising edge while FP2 is captured on the falling edge, one-half of a DL_CLK period is subtracted from the delay count. If FP1 is captured on the falling edge while FP2 is captured on the rising edge, one-half DL_CLK period is added. The result could be captured in a 23-bit unsigned integer that represents the delay expressed in half DL_CLK clock periods. The coarse grain delay between two frame pulses is shown in Equation 1.

$$cgDelay = \left(CGDC \times \frac{1}{2}T_{DL\_CLK}\right) \quad \text{Equation 1}$$

In the CHECK state, the adjusted delay value is compared against a programmed minimum and maximum delay. If the measured delay is less than the minimum or greater than the maximum, an out-of-range indication is triggered. If the CGDC delay counter had saturated, the out-of-range indication will always be triggered. This indication is useful if there is a known reasonable bound on the expected delay and it is desirable to embody a mechanism to indicate an out of bounds event.

Figure 7:
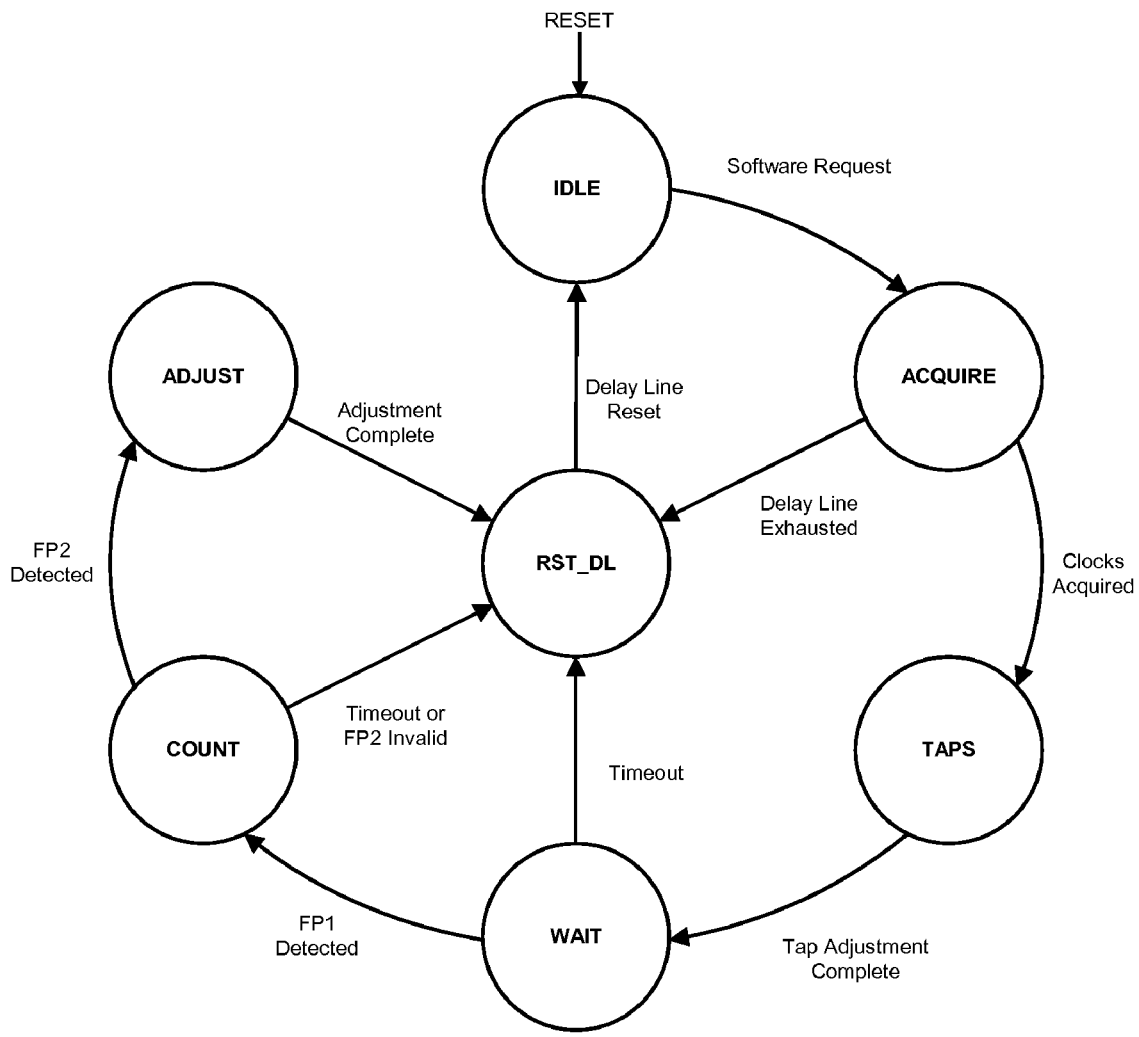
FIG. 7 shows a fine grain FSM in accordance with the present invention.

In accordance with the present invention, fine grain delay is measured by counting the number of half Delay Line Clock (DL_CLK) clock periods between two selected reference frame pulses, like coarse grain delay, and approximating the time between the two clocks associated with the frame pulses to enhance the accuracy of the measurement. This method enables a delay measurement to be accurate within a fraction of a DL_CLK period, whereas the accuracy of a coarse grain delay measurement is limited to slightly above one DL_CLK period. The exact amount of the uncertainty is dependant on the physical implementation of the circuit. A Fine Grain Finite State Machine (FG_FSM) is illustrated in FIG. 7. For this example one Fine Grain FSM is instantiated to perform fine grain delay measurements, so delay measurements must occur serially—one reference frame pulse pair at a time. However, it should be understood that one skilled in the art could provide for parallel delay measurement of all delay paths by only slight modification without straying from the intended scope of the present invention.

After system reset, the FG_FSM enters the IDLE state. The FSM remains in this state until it is provisioned and a delay measurement is requested. During this state, the reference frame pulse input pair to undergo delay measurement must be identified. For purpose of explanation one selected frame pulse input is identified by the value stored in Fine Grain Frame Pulse One Selection (FGFP1_SEL) storage element. The second frame pulse input is identified by the value stored in FGFP2_SEL. When a delay measurement request is received, the FSM transitions to the ACQUIRE state.

Figure 8:
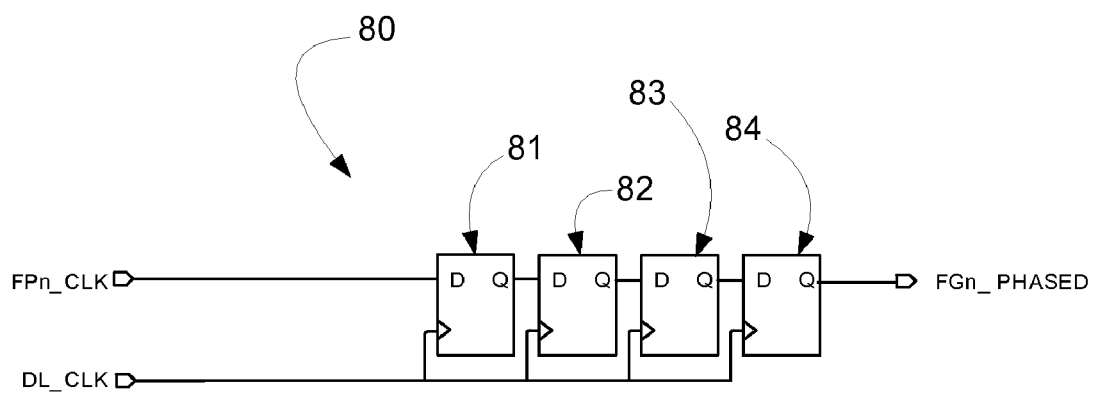
FIG. 8 shows a phase detection circuit in accordance with the present invention.
Figure 9:
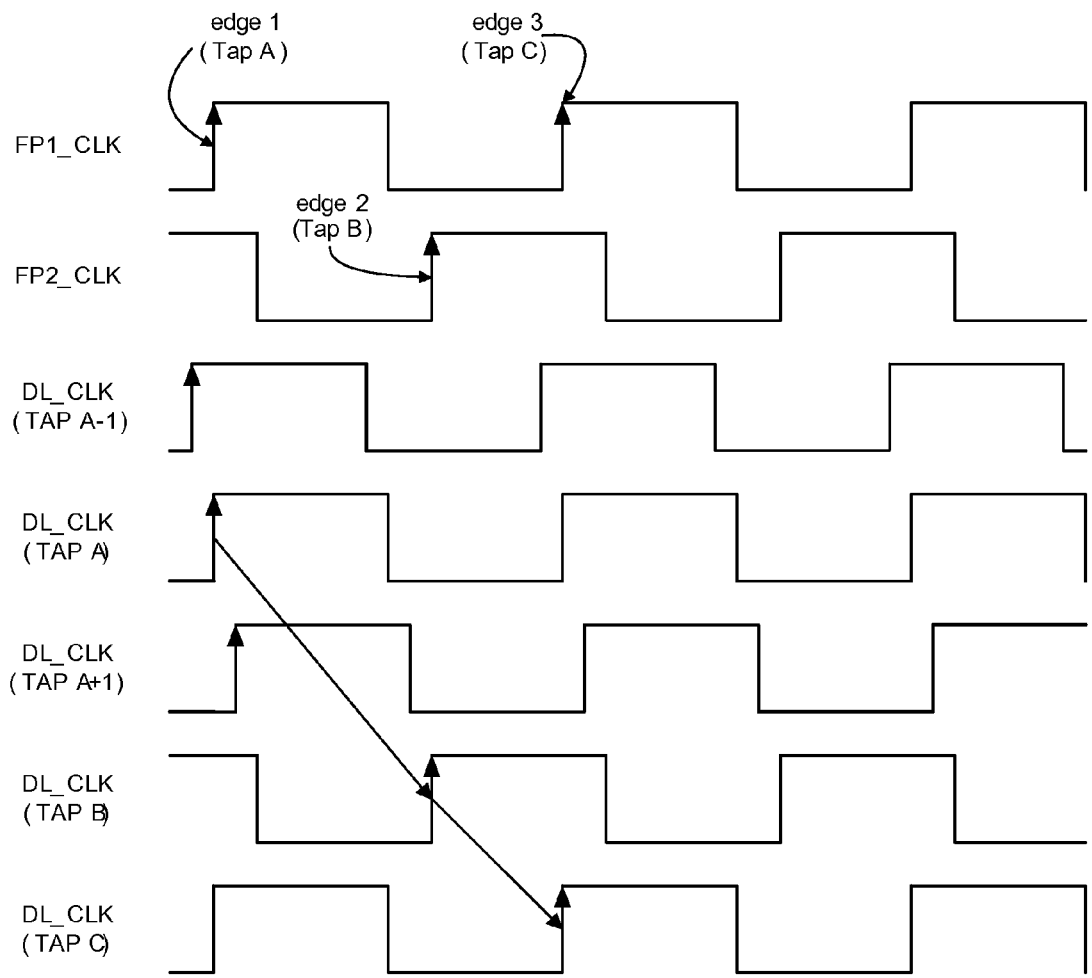
FIG. 9 shows a delay line clock output in accordance with the present invention.

In the ACQUIRE state, the FSM searches for three clock edges in sequence, see edges 1, 2 and 3 in FIG. 9. Using a delay line, the FSM shifts the phase of the delay line output clock one tap at a time. Details regarding the delay line are described hereinbelow with regard to FIG. 11. After each shift, the Fine Grain Phase Detector Circuit output, Fine Grain Phase for Frame Pulse n Detected (FGn_PHASED), associated with the clock source identified in FGFP1_SEL is monitored to determine if a rising edge has been found. FIG. 8 shows this Fine Grain Phase Detection circuit 80 that includes a capture flop 81 that is clocked by DL_CLK and has its D input connected to FPn_CLK. Because the phase between these two clocks is unknown, additional flops 82-84 are inserted to ensure the signal has settled to a stable value in the presence of a metastable event before being used by the FG_FSM. DL_CLK is equal or greater in frequency to FPn_CLK. If a rising edge has been found, the delay line tap setting is captured in a storage element (not shown). The FSM proceeds in a similar fashion until a rising edge has been found for the clock source identified in FGFP2_SEL. This second tap setting is captured in a second storage element (not shown). Finally, a second rising edge of the clock source identified in FGFP1_SEL is searched for tap-by-tap. When found, the tap setting is stored in a third storage element (not shown). FIG. 9 depicts the waveform view of this process.

FP1_CLK, FP2_CLK, and DL_CLK are shown to have the same frequency, but differ in phase. In general, FP1_CLK and FP2_CLK can have frequencies that are integer divisible by DL_CLK. The phase of the delay line output clock, DL_CLK, is shifted in time one tap worth of delay per tap setting increment, starting at a tap setting of zero and progressing until all three required clock rising edges are found. Five DL_CLK phases are shown in the figure. Tap setting A−1 results in the delay line output clock rising edge occurring just prior to FP1_CLK rising edge. Tap setting A has both rising edges occurring simultaneously. Tap setting A+1 has DL_CLK rising edge occurring just after FP1_CLK rising edge. Tap A is tagged as the setting corresponding to the first rising edge of FP1_CLK. Tap B is tagged as the setting corresponding to the rising edge of FP2_CLK. Tap C is tagged as the setting corresponding to the second rising edge of FP1_CLK. Uncertainties, such as flop setup and hold timing requirements and clock skew, may impact the exact tap setting selected for each clock rising edge. After all three edges have been found, the FSM transitions to the TAPS state. If the FSM exhausts the length of the delay line before finding all three edges, an error indication is flagged and the FSM transitions to the RST_DL state.

The TAPS state is provided for making a fine adjustment to the delay line output clock. This may be desired to compensate for clock skew within a device. After the ACQUIRE state has been fulfilled, the FG_FSM can forward-date or back-date the delay line clock by a programmable number of taps. For example, this programmed number could be a 4 bit two's complement integer, resulting in a possible tap adjustment of between −8 and +7 taps.

At the completion of the TAPS state, DL_CLK is now synchronized to the Frame Pulse One Clock, FP1_CLK, associated with the frame pulse source identified in FGFP1_SEL storage element. With DL_CLK synchronized with FP1_CLK the one-half DL_CLK period of uncertainty associated with the asynchronous capture of FP1 on the DL_CLK island has been removed. This reduces the overall uncertainty down to just over one-half of a DL_CLK period, versus just over one DL_CLK period for a coarse grain delay measurement. The delay line subsystem is used to further diminish this uncertainty. The benefit of reducing the uncertainty by one-half a DL_CLK period is that this allows a corresponding reduction in the maximum amount of possible delay required to be introduced by the delay line, therefore allowing a reduction in the size of the delay line circuit. A fine grain algorithm that does not impose this synchronizing of DL_CLK and FP1_CLK could also have been described here. The result would have been the need for an increase in the maximum amount of delay introduction offered by the delay line subsystem. But for clarity only one method is explored at this time. The FSM then waits to synchronously detect the assertion of Frame Pulse One, FP1. Once FP1 is detected, the FSM moves to the COUNT state. If the FP1 pulse is not detected within a timeout period of, for example, 0x7FFFFF DL_CLK half-cycles, a timeout error is indicated and the FSM transitions to the RST_DL state.

In the COUNT state, a Coarse Grain Delay Counter for Fine Grain Measurements (CGDC_FG) is incremented twice per DL_CLK clock cycle until the second frame pulse in the pair is detected. When either FP2_POS or FP2_NEG is asserted, the delay counter is frozen and the state machine transitions to the ADJUST state. If during the COUNT state the second frame pulse is never asserted, the counter saturates, an error is indicated and the FSM transitions to the RSTDL state.

In the ADJUST state, the FSM calculates a delay adjustment based on the clock edges that two frame pulses were detected on. Because DL_CLK is synchronized to the FP1_CLK, FP1 will always be captured on the rising edge of DL_CLK. If FP2 is captured on the rising edge of DL_CLK, no adjustment is required. If FP2 is captured on the falling edge of DL_CLK, one-half of a DL_CLK clock period is subtracted from the CGDC. The result is a 23-bit integer that represents the delay expressed in half DL_CLK clock periods. Once the adjustment has been made the FSM transitions to the RSTDL state.

In the RSTDL state, the delay line is gracefully reset (rather than a hard reset) to Tap 0. The delay line needs to be reset to prepare for a subsequent delay measurement request. The reset is graceful to prevent a glitch within the delay calculation logic as the delay line clock, DL_CLK, clocks much of this logic.

As described above there are four main outputs of the FGFSM; Tap setting A, setting B, setting C, and the CGDC value. The phase offset of the two input frame pulse clock sources, FP1_CLK and FP2_CLK, can be approximated as per Equation 2.

$$PhaseOffset = \frac{TapC - TapB}{TapC - TapA} \times T_{DL\_CLK} \qquad \text{Equation 2}$$

The total delay between the two frames pulses, FP1 and FP2, can be approximated as per Equation 3, where $T_{FP1\_CLK}$ and $T_{FP2\_CLK}$ are the clock periods of FP1_CLK and FP2_CLK, respectively.

$$FgDelay = \qquad \text{Equation 3}$$
$$\left(CGDC \times \frac{1}{2} T_{DL\_CLK}\right) + (T_{FP1\_CLK} - T_{FP2\_CLK}) - PhaseOffset$$

The Frame Pulse and Phase Detector (FPPD) Subsystem in accordance with the present invention is a circuit used during fine grain and coarse grain delay measurements. The circuit detects and provides an indication of the occurrence of a frame pulse and the occurrence of a rising edge of the clock associated with the frame pulse, both with respect to the delay line clock, DL_CLK. An FPPD Subsystem is physically placed as close as possible to each frame pulse source. For a 32-frame pulse source device there would be 32 FPPD subsystems instantiated. This approach of distributing the circuits in taken to minimize the amount of clock tree skew and affects of PVT on the delay measurement circuit. An opposing method of co-locating the FPPD circuits in one common area on the device would impose the addition of significant distortion to the signals due to attributes such as clock tree delay, skew, PVT effects, and on-chip variations. This disclosure does not preclude the use of a co-located approach.

Figure 10:
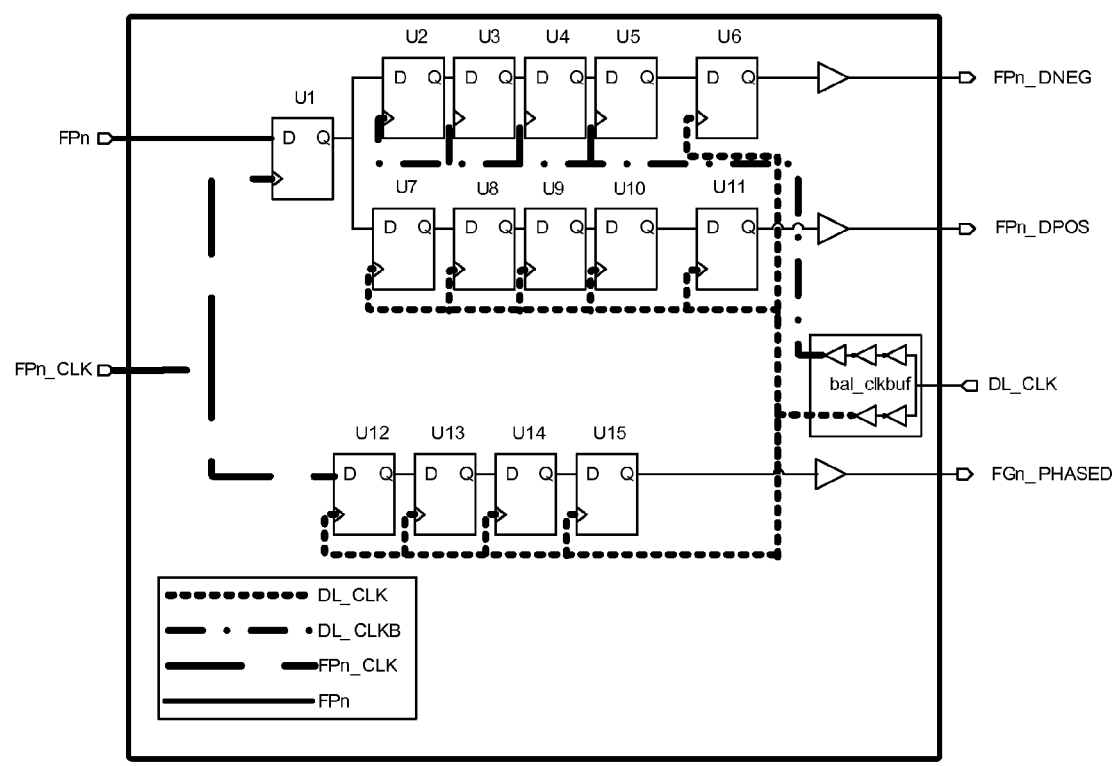
FIG. 10 shows a frame pulse and clock phase detection circuit in accordance with the present invention.

The FPPD subsystem in accordance with the present invention is shown in FIG. 10. The FPPD circuit includes two functional parts: a frame pulse detector (collectively U1 through U11) and a phase detector (collectively U12 through U15).

The frame pulse detection circuit is used during coarse grain delay measurements. Inputs to frame pulse detector are the source Frame Pulse n (FPn) to undergo measurement, where n refers to the specific frame pulse source out of the group of possible frame pulse sources (i.e., thirty-two for this example), the clock associated with FPn (FPn_CLK) and the Delay Line Clock (DL_CLK). Outputs of the circuit are two indications, Frame Pulse n Detected on the Negative Edge of Delay Line Clock (FPn_DNEG) and Frame Pulse n Detected on the Positive Edge of Delay Line Clock (FPn_DPOS). The FPn input is generated by framing circuitry outside the scope of this disclosure though well understood to one of ordinary skill in the art. This external framing circuitry is clocked by FPn_CLK and contains many clocked elements and gates. Because the circuit is large, the clock tree driving this framing logic has significant delay, skew, and susceptibility to PVT effects. This precludes the clock from this clock tree from being used to drive the FPPD subsystem as the accuracy of the delay measurement would be diminished by these distortions. Instead, the FPn_CLK supplied to the FPPD circuit is sourced as close as possible to the clock input associated with FPn. This leads to a deep clock tree being used to clock the external framing logic and a shallow clock tree being used to supply a clock input to the FPPD logic. FPn is retimed from the deep FPn_CLK island to the shallow FPn_CLK island by the Frame Pulse Detection circuit. For this to work properly, the total skew, including all distortion effects, between the two clock islands must be less one FPn_CLK clock period, leaving margin for the propagation time and setup time of the underlying storage elements used to launch FPn from the framing logic and capture FPn into the FPPD subsystem, respectively. This retiming is performed by the U1 flop shown in FIG. 10. The four flops, U2 through U5, clocked by DL_CLKB following this flop retime FPn on the negative edge of the DL_CLK island. The crossing from flop U1 to flop U2 is usually treated as asynchronous, as often the phase relationship between FPn_CLK and DL_CLK is unknown. The one exception is when a fine grain measurement is being made. When this is the case the crossing from U1 to U2 is synchronous for the frame pulse source selected by FGFP1_SEL storage element after the FG_FSM enters the COUNT state. Flops U3, U4, and U5 are present to ensure any metastability effects settle out before the signal is retimed to the positive edge of DL_CLK by flop U6. FPn_DNEG is driven high whenever a frame pulse on signal FPn was detected on the falling edge of DL_CLK. The same function is performed by the five flops clocked by the positive edge of DL_CLK. FPn_DPOS is driven high whenever a frame pulse on signal FPn was detected on the raising edge of DL_CLK. The Coarse Grain Finite State Machine (CG_FSM) uses these two outputs to perform a coarse grain measurement as seen in FIG. 4.

The phase detection circuit is used during fine grain delay measurements. Inputs to the phase detector are the clock associated with FPn input to undergo measurement, FPn_CLK, and the DL_CLK. The circuit outputs one indication, Fine Grain Phase for Frame Pulse n Detected (FGn_PHASED). As with the frame pulse detection circuit, FPn_CLK is extracted immediately from the source, passing through the minimum number of clock tree buffers and restricted from clocking any other logic, to ensure the clock provided to the phase detection circuit is as close a representation as possible to the actual source clock. This is done to minimize the distortion, and therefore uncertainty, added to the clock. Any uncertainty added to this clock is directly added to the overall uncertainty of the entire delay measurement circuit. FPn_CLK is captured by flop U7, which is clocked by DL_CLK. FPn_CLK is asynchronous to DL_CLK and therefore a metastable event may occur during this capture. Flops U8, U9, and U10 are present to ensure any metastability effects settle out before the signal is passed to the Fine Grain Finite State Machine (FG_FSM) for processing. FGn_PHASED is driven high whenever a high value of the FPn_CLK was detected on the rising edge of DL_CLK. The FG_FSM uses this output to perform a fine grain measurement.

Figure 11:
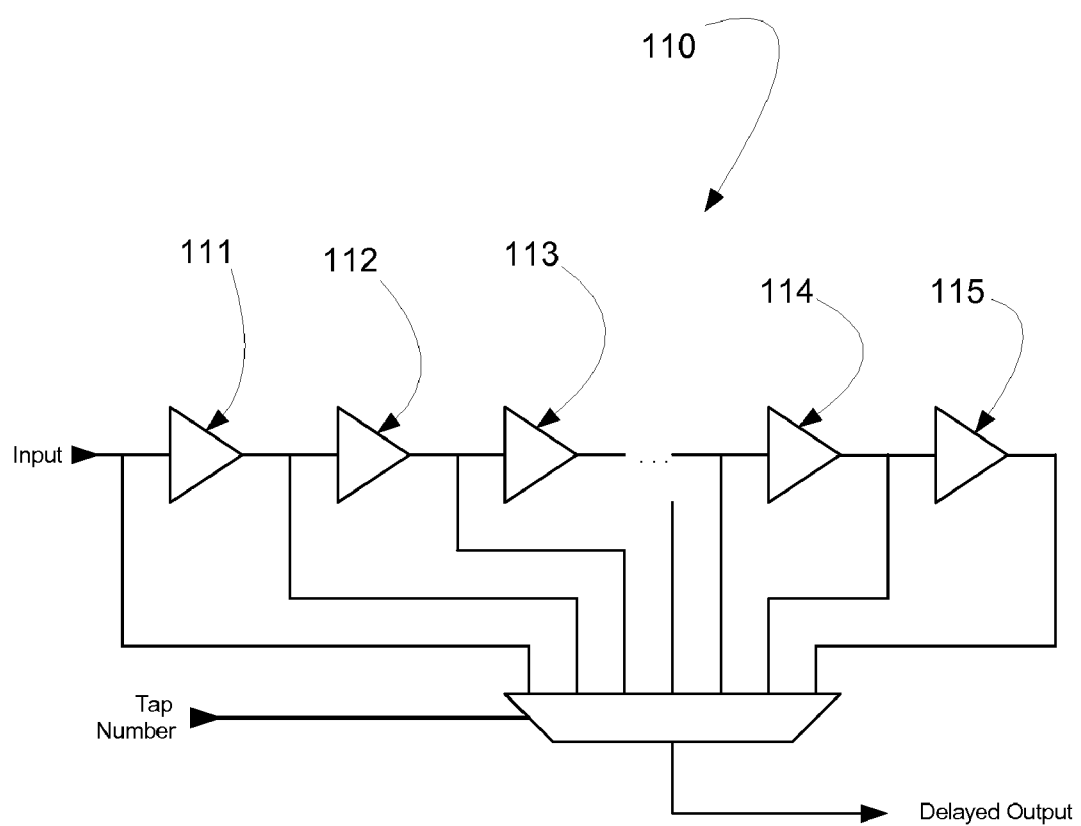
FIG. 11 shows a delay line in accordance with the present invention.

The Delay Line (DL) subsystem as seen in FIG. 4 is used by the Fine Grain Finite State Machine (FG_FSM) to perform fine grain delay measurements. FIG. 11 shows a basic configuration of a delay line. The source clock is input on the left and passes through delay elements, in this illustration shown as buffers 111-115. The delay elements could be comprised of other circuit elements. The amount of delay to be introduced between the input and delayed output is controlled by the tap number input. This controls which buffer output is selected as the Delayed Output. A high quality Source Clock, for example DL_CLK, is provided to the input of the delay line circuit. The output of the circuit, Delayed Output, is referred to in this embodiment as Delay Line Clock (DL_CLK). The FG_FSM drives the Tap Number input.

As an alternative to the DL shown in FIG. 11, delay measurement may be accomplished using a phase scanner. Because on-chip high speed Clock Synthesizing Units (CSUs) in GHz range are readily available with current technology, one way to achieve sub-nanosecond delay measurement accuracy is to use the high GHz clock directly to measure distance between two frame pulses. One implementation is to use coarse grain delay measurement as already described hereinabove. However, the digital logic in this approach used for delay measurement must run at a very high speed (in GHz range), and thus can involve more costly mixed signal design with related higher power consumption than a phase scanner implementation. A phase scanner can therefore be used for delay measurement with the FPPD circuit detailed hereinabove as an alternative approach to the delay line subsystem described in regard to FIGS. 4 and 11. This alternative approach facilitates low-cost standard-cell implementation for on-chip delay measurement of multiple delay paths, while maintaining the sub-nanosecond accuracy of using GHz clocks.

Figure 12:
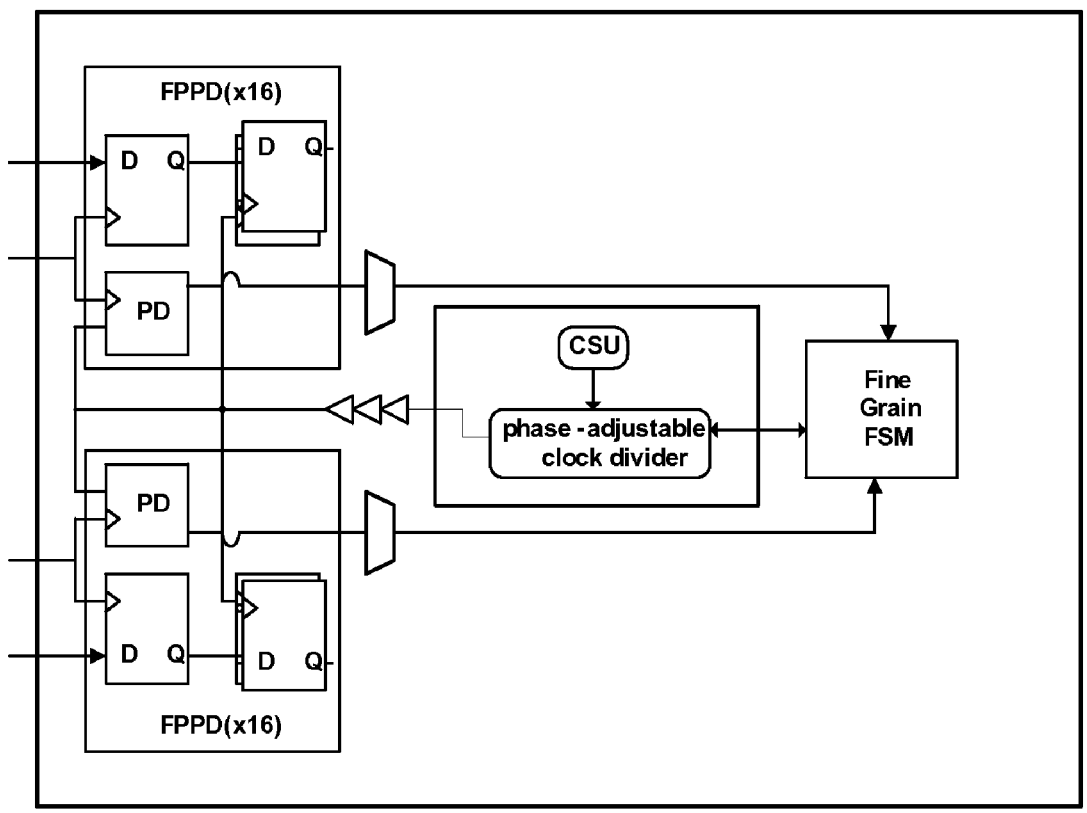
FIG. 12 shows a block diagram of delay measurement using a phase scanner in accordance with the present invention.

A block diagram of delay measurement using a phase scanner is shown in FIG. 12. Here, the CSU outputs four phase-shifted 2457.6 MHz clocks. A phase-adjustable clock divider is implemented in mixed signal design to generate a 245.76 MHz clock with phase shift accuracy of about 101 ps excluding clock jitter. The distributed FPPDs all run at the output clock of the phase-adjustable clock divider. As before, a fine grain FSM controls the phase-adjustable clock divider and provides control logic for actual delay measurement. However, the fine grain FSM now controls the phase-adjustable clock divider instead of a delay line, and a tap is redefined as one phase step of the phase-adjustable clock divider. The fine grain FSM divides a 245.76 MHz clock cycle into 40 equally spaced taps.

Figure 13:
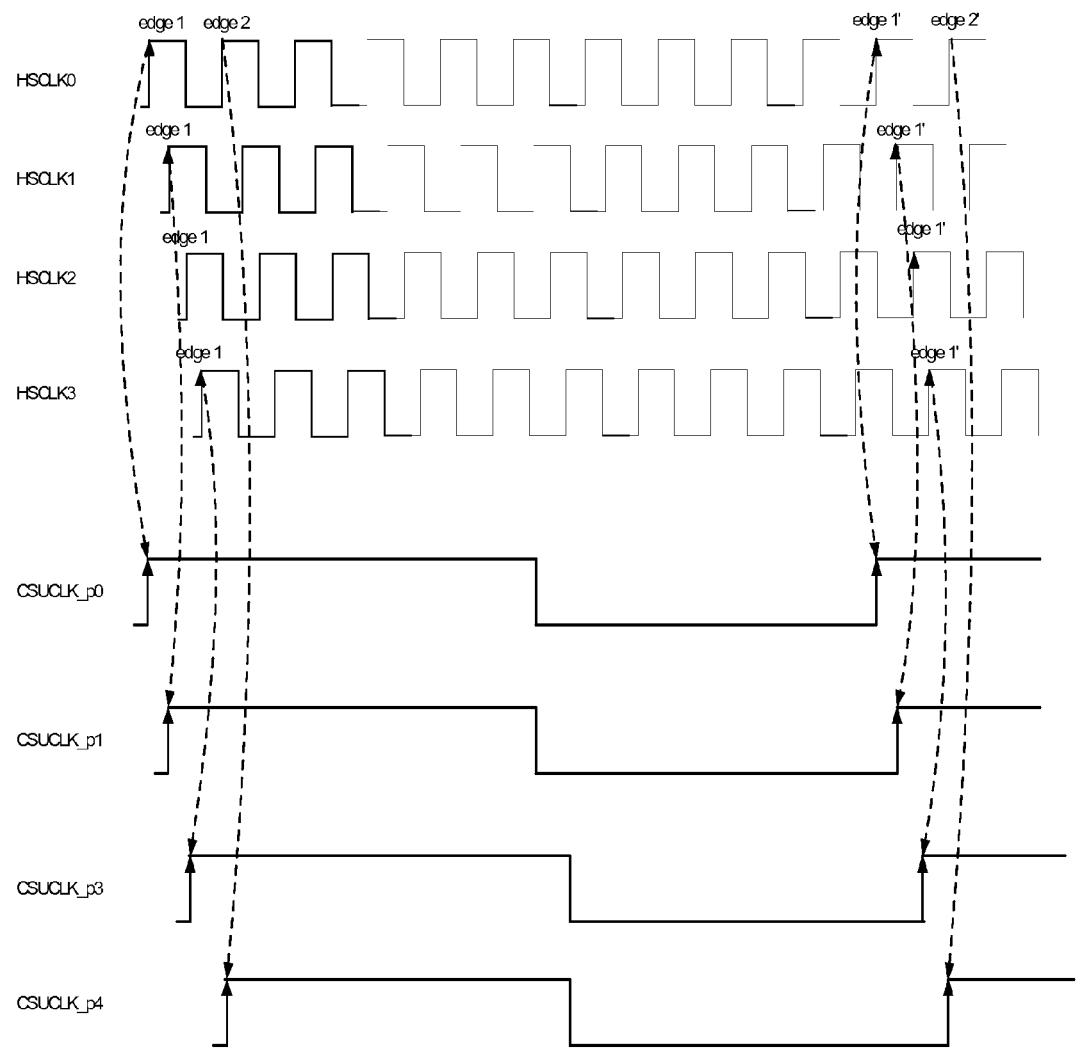
FIG. 13 shows phases of the phase-adjustable clock divider in accordance with the present invention.

The fine grain FSM instructs the phase-adjustable clock divider to move its phase tap-by-tap as illustrated in FIG. 13. Here, the CSU generates four 90-degree phase shifted 2457.6 MHz clocks, HSCLK0~HSCLK3. As a dividing ratio of 10 is used, every 10 clock edges of each of HSCLK0~HSCLK3 are equivalent in interval, and their edges are labeled edge 1, edge 2, . . . , edge 1', etc, where edge 1' refers to an edge that is 10 bit clock cycles apart from edge 1. Phase 0 clock of the divider output, as denoted by CSUCLK_p0 in FIG. 13, is derived from edges of HSCLK0 that are equivalent to HSCLK0's edge 1. Similarly, phase 1 clock CSUCLK_p1 is derived from edges of HSCLK1 that are equivalent to HSCLK0's edge 1, while phase 4 clock CSUCLK_p4 is derived from edges of HSCLK0 that are equivalent to HSCLK0's edge 2.

Figure 14:
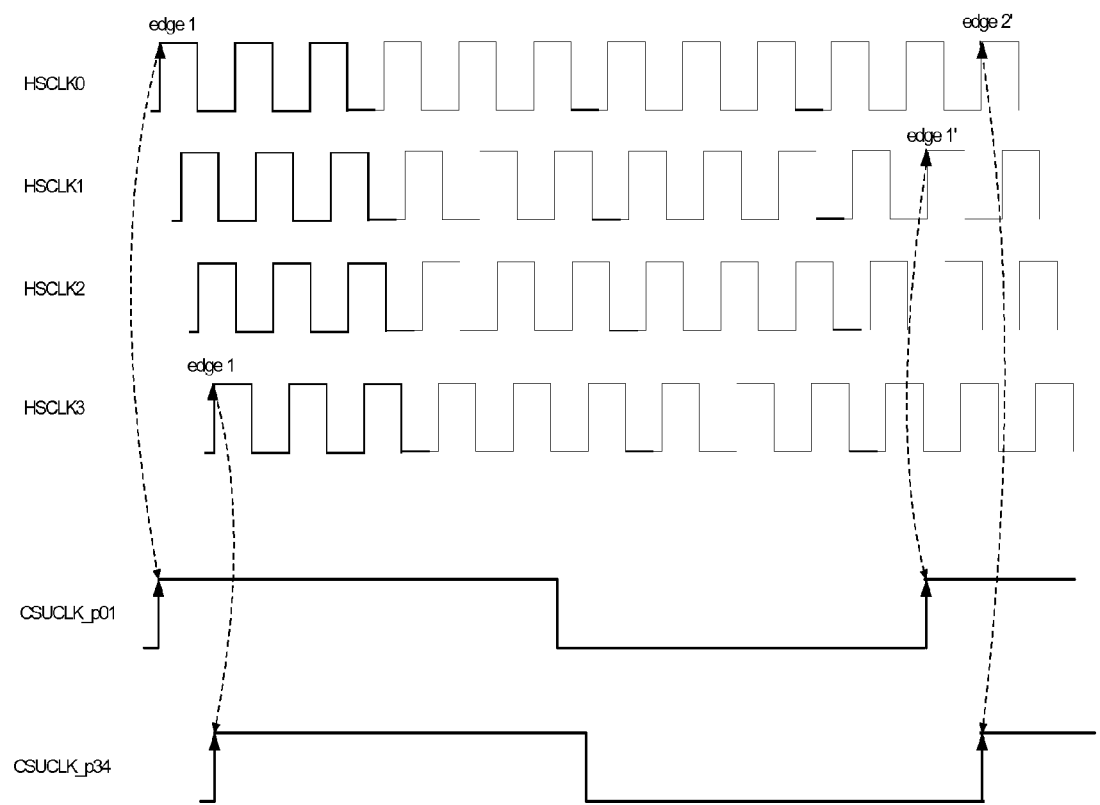
FIG. 14 shows phase tuning of the phase-adjustable clock divider in accordance with the present invention.

At startup, the phase-adjustable clock divider defaults on phase 0 clock, CSUCLK_p0. Next, the fine grain FSM instructs the phase-adjustable clock divider to move to phase 1 from phase 0. This phase shift is equivalent to one tap movement with respect to the delay line described in regard to the delay line subsystem of FIG. 11, and is shown as CSUCLK_p01 in FIG. 14. Here, before phase shift, CSU- CLK_p01 derives its phase from edge 1 of HSCLK0 and aligns to phase 0 clock. After phase shift, CSUCLK_p01 derives its phase from edge 1' of HSCLK1 and aligns to phase 1 clock. The phase-adjustable clock divider implements this phase shift through a synchronous dynamic clock multiplexer at the input of a nominal clock divider. As another example of tap movement, CSUCLK_p34 originally derives its phase from edge 1 of HSCLK3 and aligns to phase 3 clock. Next, the fine grain FSM instructs the phase-adjustable clock divider to move one tap. As a result, the next edge of CSUCLK_p34 derives its phase from edge 2 of HSCLK0 and aligns to phase 4 clock.

The present invention may also be implemented in a subsystem which contains a serializer-deserializer. Here, a method for measuring delay introduced by a SERDES subsystem will be described. High-speed serial links are employed as the technology to communicate between remote radio units and a baseband unit in a distributed topology. This high-speed serial interconnect is terminated by analog circuitry that converts data received on a high-speed serial data stream to a lower speed parallel data bus format in the receive direction, and coverts a lower speed parallel data bus to a high-speed serial data stream in the transmit direction. The receive direction analog block is often referred to as a Serial-In-Parallel-Out (SIPO) block. The transmit direction analog block is often called a Parallel-In-Serial-Out (PISO) block. A subsystem which contains both a SIPO and PISO is often labeled a Serializer-Deserializer (SERDES). On the low-speed parallel sides of the two analog blocks, the data and clock are terminated separately. On the high-speed serial side of both blocks, the clock is embedded in the data and therefore the only signal terminated is one-bit data stream. Delay is introduced when user data traverses these analog blocks. The amount of delay introduced is dependent on several factors, such as circuit topology and PVT effects. Measuring this delay and subsequently providing the result to a higher-level protocol such that it may be calibrated out would be beneficial in contributing to the goal of containing the total delay uncertainty of the entire path to a minimum.

Measuring the delay introduced by a SERDES subsystem that is actively terminating user data is a difficult task. The clock speed and phase differs on each side of the block and introducing any distortion to the user data would be detrimental. Also, such measuring of an active subsystem can introduce delay uncertainty into the measured result that would not be able to be distinguished from the active data-path. The present method of approximating the amount of delay introduced by an active SERDES subsystem can measure the amount of delay introduced by an inactive SERDES subsystem and relate it back to the active subsystem. Some error may exist in this approach as the process component of PVT for the two SERDES will essentially be identical, but both the voltage and temperature components could differ somewhat. However, a large portion of the delay uncertainty can be calibrated out by this approach, without distorting the active data-path. Also, for a device that embodies many active SERDES subsystems it can be deemed that one inactive SERDES would be sufficient to measure and approximate the delay introduced by each of the active SERDES.

Figure 15:
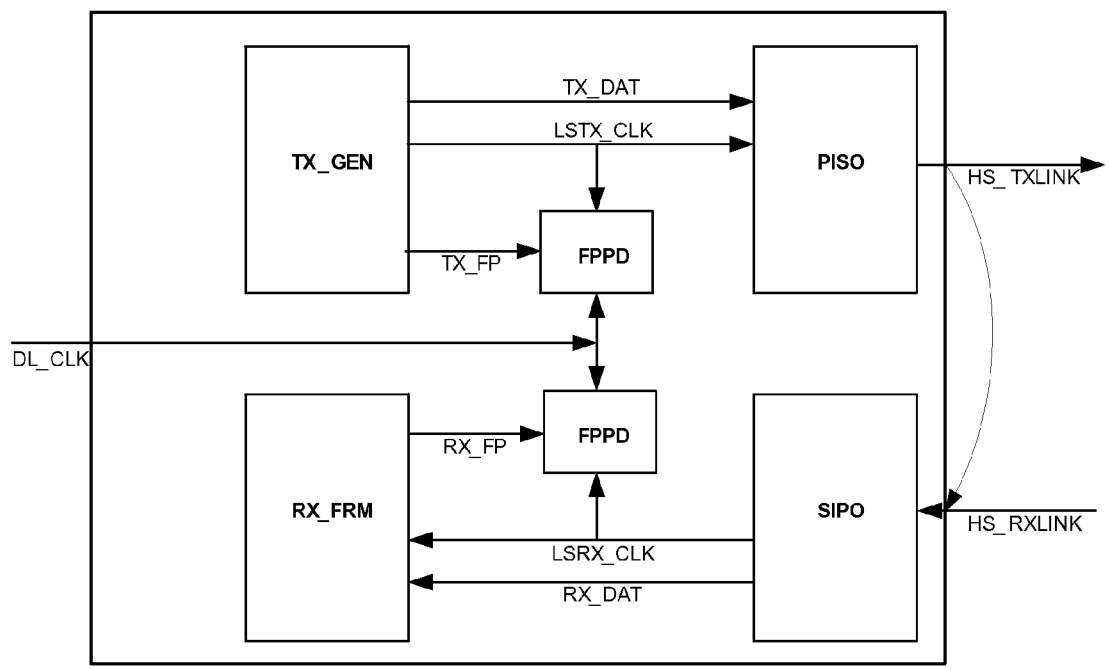
FIG. 15 shows a SERDES delay calibration block diagram in accordance with the present invention.

A block diagram of the SERDES delay calculation embodiment is depicted in FIG. 15. Low-speed parallel transmit data, Transmit Data (TX_DAT), is sourced by the Transmit Generator (TX_GEN) block and sent to the PISO block for conversion into a high-speed serial data stream format to be sent across the High-Speed Transmit Link (HS_TXLINK). The Low-Speed Transmit Clock (LSTX_CLK) is shown here to be sourced by the TX_GEN block, however alternatively the LSTX_CLK may be sourced by the PISO block. A Frame Pulse and Phase Detector (FPPD) subsystem is passed a Transmit Frame Pulse (TX_FP) signal from the TX_GEN block and is also passed the LSTX_CLK. The HS_TXLINK is directly looped-back to the High-Speed Receive Link (HS_RXLINK) via an external loop back just outside the SERDES subsystem. On the receive side high-speed serial data is received on HS_RXLINK. The SIPO performs clock and data recovery and outputs a Low-Speed Receive Clock (LSRX_CLK) and a parallel version of the recovered data, Receive Data (RX_DAT). These two signals are sent to the Receive Framer (RX_FRM) block. A second FPPD subsystem is passed a Receive Frame Pulse (RX_FP) from the RX_FRM block and the LSRX_CLK from the SIPO block.

Figure 16:
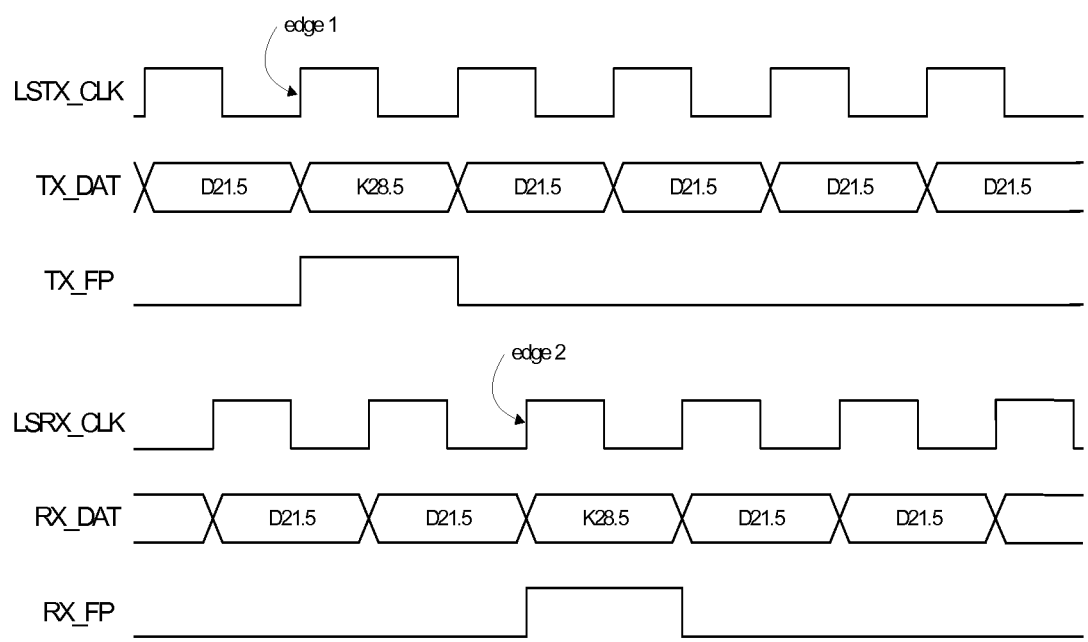
FIG. 16 shows a SERDES delay calibration timing diagram in accordance with the present invention.

The TX_GEN block generates a data pattern on the TX_DAT output that can be framed to when received by the RX_FRM. The generation of and subsequent framing to this data pattern enables the delay introduced by the SERDES subsystem to be measured and subsequently calibrated out. An illustration of this can be seen in FIG. 16. For this example the TX_GEN block generates a continuous stream of 8B/10B D21.5 characters on the TX_DAT bus with a K28.5 character inserted between D21.5 characters every N LSTX_CLK periods. In general, 8B/10B (or 8b/10b) denotes the decoding of 10-bit symbols into 8-bit bytes as is known in the art. The value of N should be large enough to ensure only one K28.5 character is in flight between the TX_GEN and RX_FRM blocks at any one time. Within each clock cycle the TX_GEN block outputs a K28.5 character, the TX_FP output is also driven active. See Edge 1 depiction for the insertion of a K28.5 character. This aligns the passing of a K28.5 character to the PISO block and the passing of a TX_FP to the FPPD subsystem. The PISO serially transmits the 8B/10B codes, which are then received by the SIPO via the loopback. The SIPO block recovers the clock and data and presents the data on the parallel RX_DAT bus. At this point the arbitrary bit alignment of the data on the RX_DAT data bus may not be synchronized on 8B/10B character boundaries. The RX_FRM bit-serially searches the received data stream for the occurrence on a K28.5 character. When a K28.5 is found the RX_FRM continues to validate this alignment by inspecting that each 8B/10B character received is either a D21.5 or K28.5. Within each clock cycle the RX_FRM block frames to a K28.5 character, the RX_FP output is driven active. In FIG. 16, the alignment of the 8B/10B character and the RX_DAT data bus is shown to be synchronous. This is to simplify the depiction. Edge 2 shows the K28.5 character on the RX_DAT data bus, and the accompanying active RX_FP. When the data on the RX_DAT data bus does not align with the 8B/10B characters being received, the RX_FRM block captures the bit offset between the two alignments in a storage element (not shown) for use by a higher-level delay calibration protocol. Alternatively, other framing patterns that do not utilize 8B/10B characters could be employed to achieve SERDES delay calibration without straying from the intended scope of the present invention.

The two FPPD circuits, along with a delay calculation circuit detailed above, can be employed to measure the delay between the two frame pulses, edge 1 and edge 2. This measured delay represents the delay introduced by the SERDES subsystem and can be passed to a higher-level protocol to be calibrated out.

The present inventive SERDES implementation may also include a method for measuring the arbitrary alignment delay of a SIPO circuit. A SIPO block within the SERDES subsystem receives high-speed bit-serial data and presents this data to downstream blocks in a parallel format. The SIPO block accumulates bits until enough have been received to pass a parallel word downstream. The alignment of this parallel word is arbitrary, but becomes fixed after device initialization. In the case where the data being carried by the high-speed link is 8B/10B encoded, the alignment of an 8B/10B character and the parallel SIPO output word may not match. From a device design and architectural perspective it is advantageous to align internal data buses on 8B/10B character boundaries. An 8B/10B decoder block could be employed to bit-serially search the parallel data outputted from the SIPO block, achieve 8B/10B alignment, and decode the 10-bit 8B/10B characters into 8-bit data words. The amount of delay introduced by the 8B/10B decoder is dependent on the relative alignment of the 8B/10B character alignment to the SIPO outputted parallel data bus. In a system utilizing 8B/10B coding, the maximum amount of delay uncertainty introduced by this misalignment is 9 bits. This relative bit alignment can be presented to a higher-level protocol so that the realized delay uncertainty can be calibrated out. Such calibration is further discussed hereinbelow.

The present invention further includes delay calibration methods and apparatus for distributed wireless systems. Such calibration of the delay experienced by user data as it traverses a distributed wireless system can be divided into three areas: 1) a method and apparatus to calibrate delay introduced by metastability effects, 2) a method and apparatus to compensate for delay introduced by recovered clock uncertainty, and 3) a method and apparatus to compensate for delay introduced by voltage and temperature variation effects.

Figure 17:
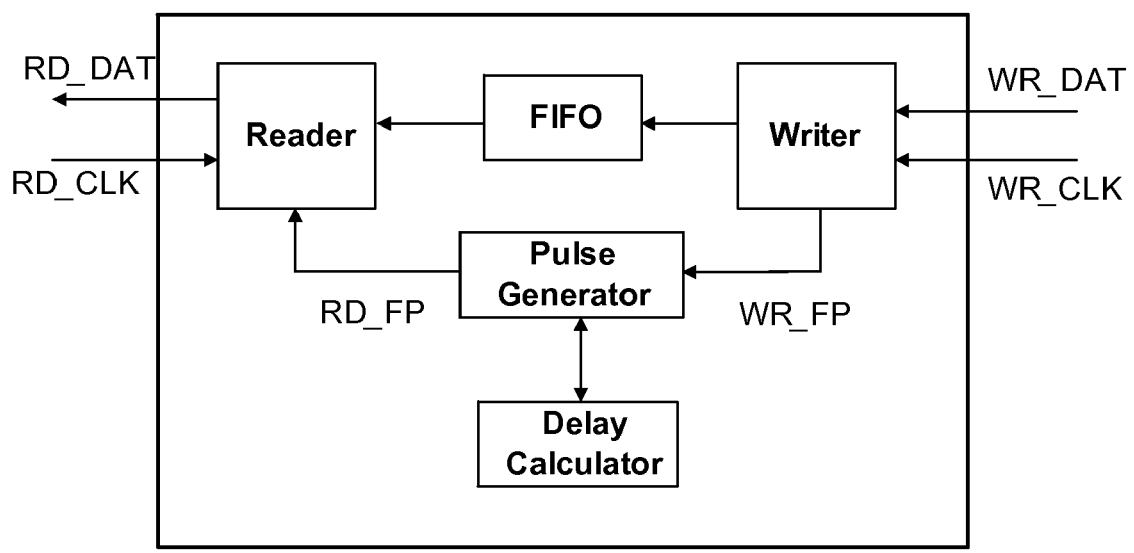
FIG. 17 shows a block diagram of delay calibration of metastability effects in accordance with the present invention.
Figure 18:
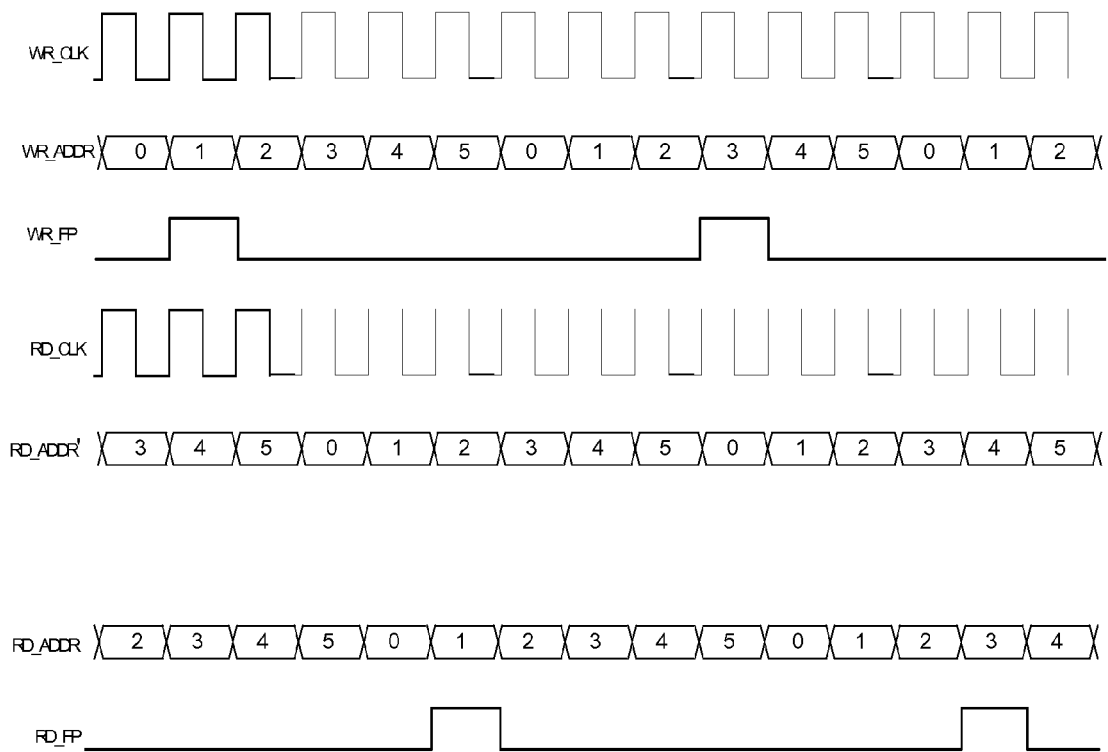
FIG. 18 shows operation of delay calibration of metastability effects in accordance with the present invention.

Delay calibration of metastabilty effects will now be discussed. In a typical CPRI/OBSAI device, the datapath must cross asynchronous clock islands. Typically, these clocks are frequency locked, their phase difference is bounded to a certain range, but their relative phase is not predicable. As a result, asynchronous FIFOs are commonly used in the datapath. The ensuing metastability effect when crossing asynchronous clock islands contributes to datapath delay uncertainty, and this uncertainty must be compensated. In the present invention, a delay calculator is used to measure the FIFO delay, including those introduced by metastability effects. Then, the FIFO depth is adjusted according to the measurement result such that the FIFO delay remains constant regardless of metastability effects. This is shown in FIG. 17 where data flows through the FIFO with a constant rate. With additional regard to FIG. 18, the writer generates a periodic Write Frame Pulse, WR_FP, on the Write Clock, WR_CLK, island. For example, WR_FP can be pulsed when writing the first FIFO location. For some applications, WR_FP can be an external pulse. Then WR_FP is passed to a pulse generator to generate a Read Frame Pulse, RD_FP, on the Read Clock, RD_CLK, island. The distance between WR_FP and RD_FP is measured by a delay calculator with a resolution better than or equals to half a RD_CLK cycle. Based on the measured result, the delay calculator instructs the pulse generator to insert one RD_CLK cycle delay when necessary so the distance between WR_FP and RD_FP remains a constant value. Then, the RD_FP is used to read the FIFO location associated with WR_FP, thus achieving constant FIFO delay. FIG. 18 details the above operation.

Here, a FIFO depth of 6 is assumed, and the WR_FP is assumed to be external and has a period of 8 WR_CLK cycles, that is, it is not a multiple of FIFO depth. In a traditional asynchronous FIFO, due to metastability effects the read address can be either RD_ADDR' or RD_ADDR. Because metastability shows up as a statistics event, it is impossible to predict before device reset which of RD_ADDR' and RD_ADDR is actually executed by the device. However, the two scenarios have different FIFO delay. If RD_ADDR' is executed, then FIFO delay is 3 cycles, whereas it is 4 cycles if RD_ADDR is executed. Because FIFO delay can be measured with a delay calculator with accuracy higher than half a clock cycle, this FIFO delay uncertainty can be compensated by stalling the FIFO read by one clock cycle if the FIFO delay is measured to be 3 clock cycles. As a typical delay calculator is implemented to measure delay between two frame pulses, one implementation is to generate RD_FP that has a fixed delay with respect to WR_FP as calibrated by the delay calculator. The RD_FP is used to schedule FIFO reads such that the read address upon RD_FP is the stored write address upon WR_FP. This guarantees that RD_ADDR is always executed, and constant FIFO delay is achieved under metastability effects.

Figure 19:
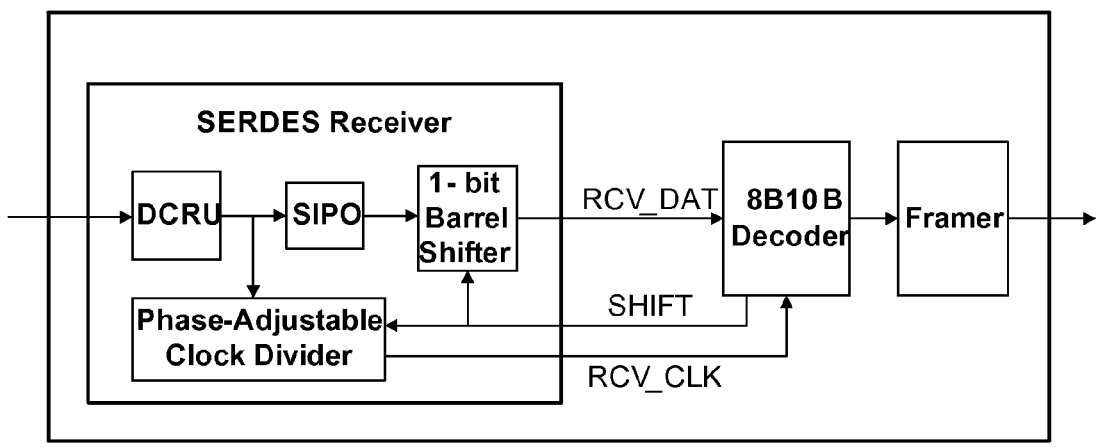
FIG. 19 shows a block diagram of delay compensation of recovered clock phase uncertainty in accordance with the present invention.

Delay compensation of recovered clock phase uncertainty will now be discussed. In a typical implementation, a high-speed Serial-In-Parallel-Out (SIPO) circuit is implemented after the Data and Clock Recovery Unit (DCRU) of a SERDES receiver to generate a recovered bus clock and bus data for low-speed digital logic. Because an 8B/10B decoder and framer are typically implemented in the low-speed digital logic, the SERDES receiver has no reference to lock the phase of its recovered bus clock. As a result, the recovered bus clock has a phase uncertainty of up to 9 bit clocks. Because the clock used to time a remote radio head is derived from the recovered bus clock, this phase uncertainty translates directly to delay uncertainty of all datapaths of a remote radio head. In the present invention, this phase uncertainty can be compensated through a modified SIPO within the SERDES receiver as shown in FIG. 19 where the original SIPO used to generate recovered bus clock and bus data is modified and comes under the control of the 8B/10B Decoder. With additional regard to FIG. 20, the 8B/10B decoder performs an exhaustive search over a 19-bit sliding window to find the 8B/10B comma character, and when found it instructs the SERDES receiver to shift its alignment to synchronize with the 8B/10B characters. To achieve this, a 1-bit Barrel Shifter is added after the SIPO to barrel shift the Recovered Bus Data, RVC_DAT[9:0], by one bit per request when instructed by the 8B/10B Decoder. The original SERDES Clock divider is modified to a Phase-Adjustable Clock Divider. When instructed by the 8B/10B Decoder, the Phase-Adjustable Clock Divider will increase its running counter by one, thus tuning the phase of the RVC_CLK by one recovered bit clock cycle, and eventually to align it with the start of an 8B/10B character.

Figure 20:
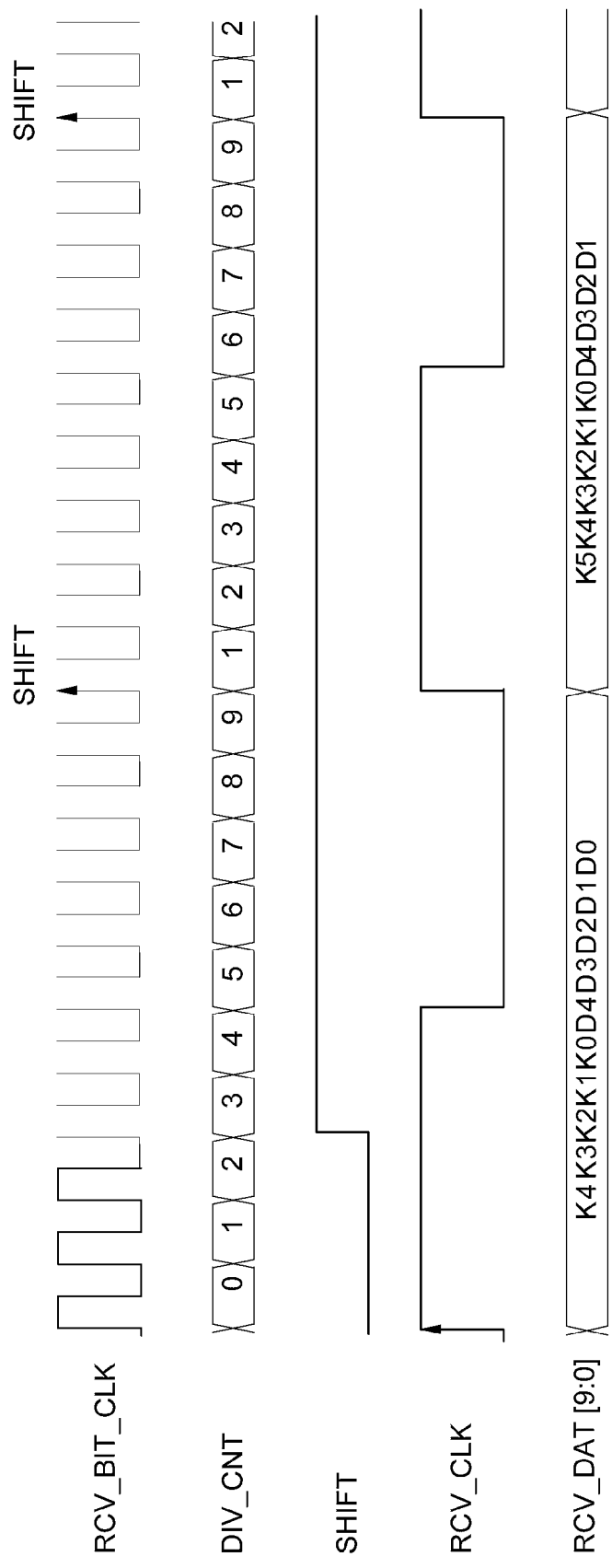
FIG. 20 shows timing diagram of delay compensation of recovered clock phase uncertainty in accordance with the present invention.

The above operation is shown in FIG. 20 where RCV_CLK is driven high upon the next rising edge of recovered bit clock, RCV_BIT_CLK, when the divider running count, DIV_CNT, assumes a value of 9. At first, the start of comma is located at bit 5 of recovered bus data RCV_DAT[9:0]. When SHIFT is latched high upon a DIV_CNT value of 9, the phase-adjustable clock divider resets the DIV_CNT to 1 instead of 0, thus shifting the DIV_CLK phase by one recovered bit clock cycle. At the same time, the recovered bus data is barrel shifted to the right by one bit. The 8B/10B decoder drives SHIFT for a sufficient number of RCV_CLK cycles so that the start of the next 8B/10B character will be located at bit 0 of RCV_DAT[9:0].

An alternative method to achieve this alignment within a SERDES Receiver is to gate the write of one high-speed serial bit to the SIPO 10-bit storage element whenever the SHIFT indication is received from the 8B/10B Decoder. A low-speed RCV_CLK rising edge would be generated in relationship to writing a particular bit into the SIPO 10-bit storage element, for example the last bit, bit-9. Because a high-speed bit write was gated once for each received SHIFT indication the alignment of the 8B/10B character within the storage element would shift one position to the left and the low-speed clock period corresponding to that shift would be one additional high-speed bit-time longer in duration. The number of shifts required would be dictated by the 8B/10B offset determined by the 8B/10B decoder. This alternative method does not require the addition of a 1-bit barrel Shifter or Phase-Adjustable Clock Divider to the SERDES Receiver circuit. It should further be understood that other approaches could be envisioned to achieve the same functionality without straying from the intended scope of the present invention. Also, the recovered clock phase uncertainty is static, so one can also compensate for it on the far-end transmit side of the system.

Figure 21:
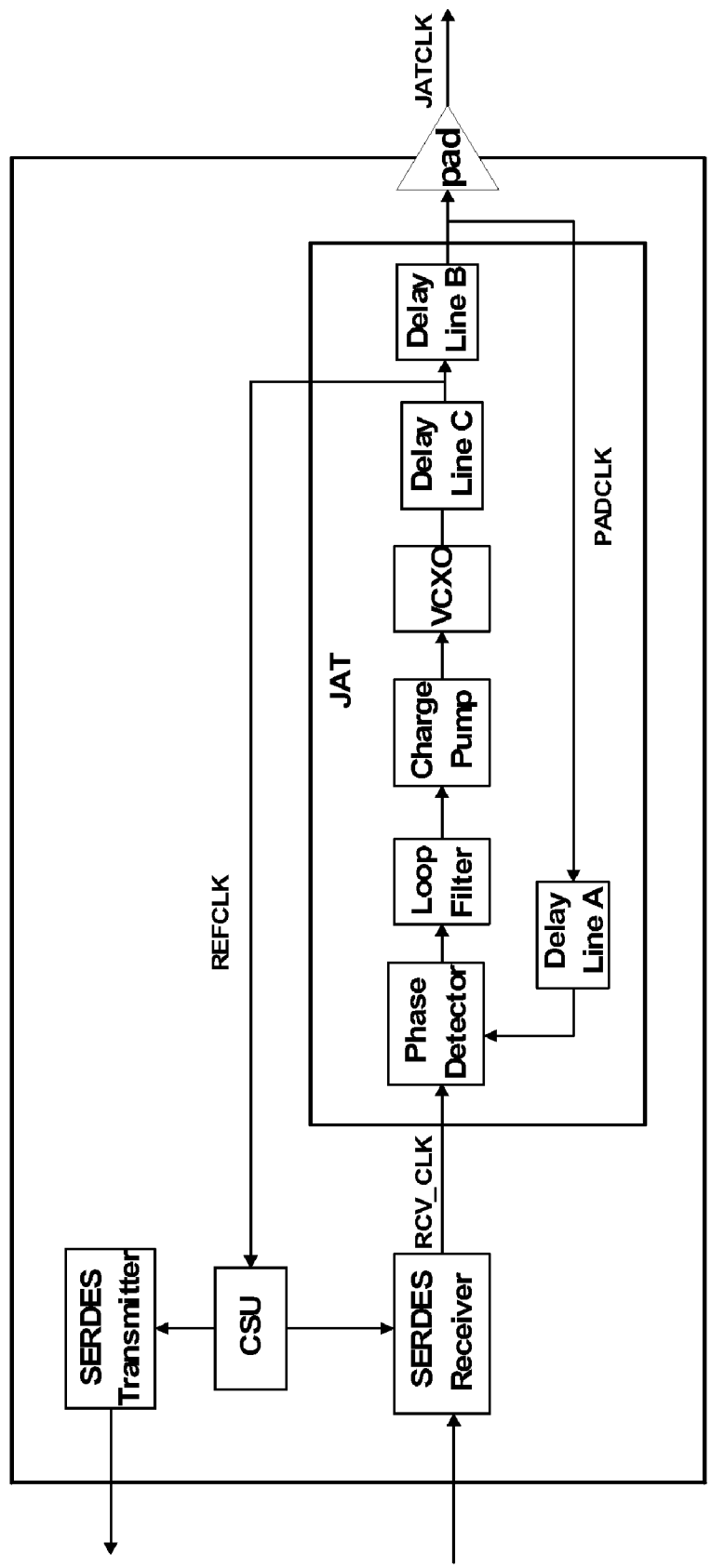
FIG. 21 shows a block diagram of delay compensation of delay uncertainty due to VT effects in accordance with the present invention.

Delay compensation of VT effects will now be described. As SERDES transmitter delay, SERDES receiver delay, and clock pad delay depends on voltage and temperature (VT), these VT effects cause dynamic delay uncertainty for datapath delay. In the present invention, delay lines with matching delay are used in the feedback path of a Jitter-Attenuator (JAT) to compensate these dynamic VT effects. This is shown in FIG. 21 where three static delay lines, A, B, and C, are used to compensate delay variation over temperature and voltage. As commonly known, the JAT as well includes a phase detector, loop filter, charge pump, voltage controlled crystal oscillator (VCXO). This circuit ensures that the delay from the SERDES receiver input to the SERDES transmitter output remains constant over temperature and voltage variations. It also ensures the JATCLK has a constant delay over temperature and voltage changes as measured from SERDES receiver input. The above operation is illustrated in FIG. 22.

Figure 22:
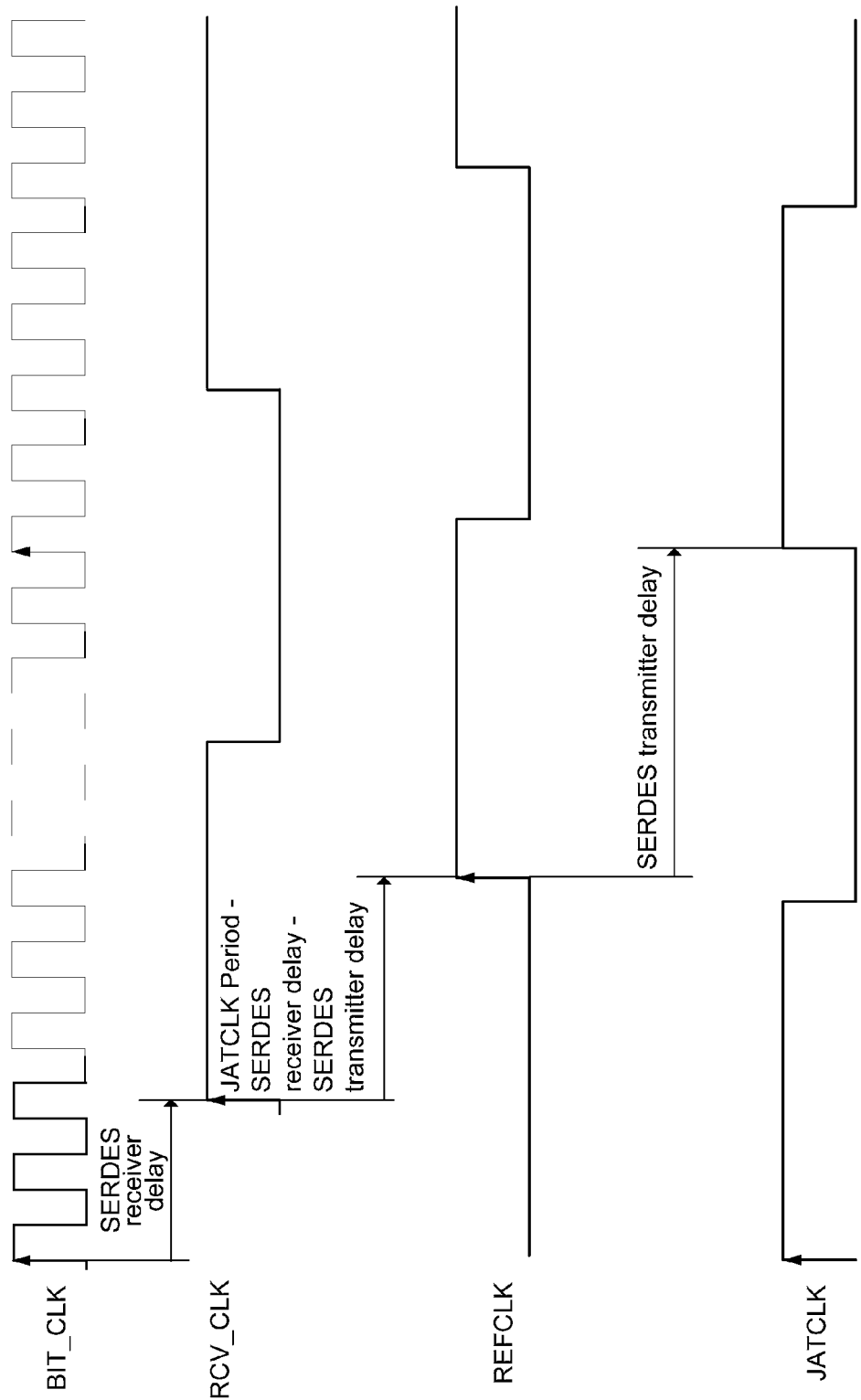
FIG. 22 shows operation of delay compensation of delay uncertainty due to VT effects in accordance with the present invention.

With regard to FIG. 22, delay line C has a delay of the JATCLK period minus the SERDES transmitter delay minus SERDES receiver delay. Delay line B has a delay of SERDES transmitter delay minus JATCLK pad delay, and delay line A has a delay of the SERDES receiver delay plus JATCLK pad delay. Because the output clock from delay line A is phase aligned to the recovered bus clock RCV_CLK, the JTACLK is always delayed by 10 bit clock cycles relative to the embedded bit clock, BIT_CLK, at the SERDES receiver input, independent of temperature and voltage changes. Similarly, the reference clock to CSU, REFCLK, is delayed from BIT_CLK by 10 bit clock cycles minus the SERDES transmitter delay. After considering delay from REFCLK to SERDES transmitter output, the delay from the SERDES receiver input to the SERDES transmitter output is also independent of temperature and voltage variations.

It should be readily apparent to one skilled in the art that the present invention can be expanded to embody a method and apparatus to measure delay introduced by a SERDES Subsystem by directly measuring the in-service SERDES subsystem delay, rather than measuring the delay through a spare SERDES subsystem and relating it back to a multitude of in-service SERDES subsystems. The present invention can be further expanded upon to incorporate a method and apparatus to measure round trip delay on the high-speed side of the SERDES Subsystem rather than the current method of measurement on the low-speed recovered clock island. As well, the present invention can be expanded still further to embody a more encompassing solution for measuring and calibrating dynamic uncertainty, such as delay variation over process, voltage, and temperature (PVT). Yet still further extensions to the current embodiment are possible without straying from the intended scope of the present invention.

Figure 23:
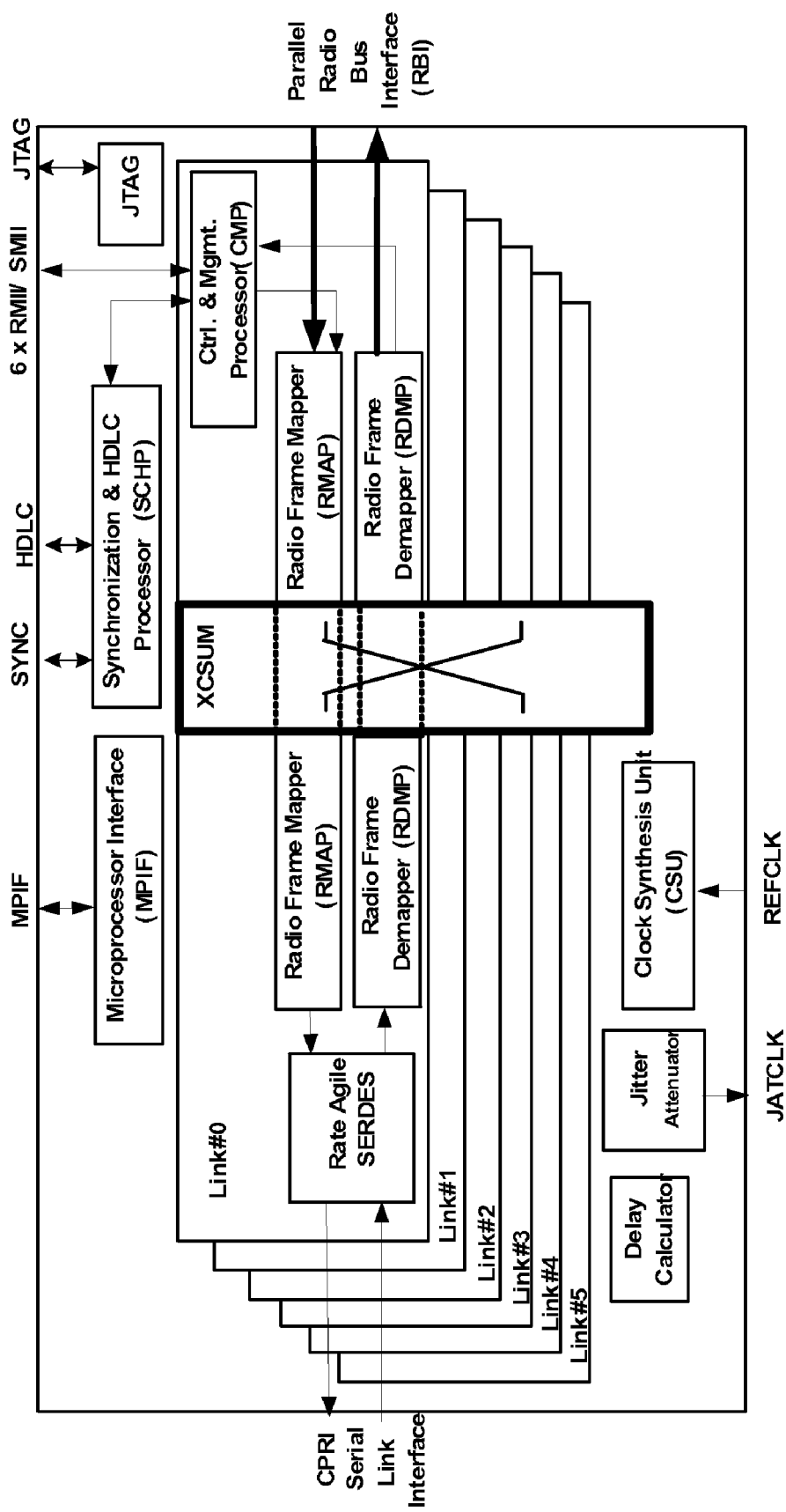
FIG. 23 shows a specific on-chip implementation using the present invention.

A further embodiment of the delay measurement and delay calibration methods and apparatus for distributed wireless systems will now be described as implemented within dedicated silicon with integrated circuits, such an application specific integrated circuit (ASIC) or field programmable gate array (FPGA). This includes either a highly integrated single chip implementation, or discrete implementation with multiple chips or components. In particular, such single chip implementation discussed herein involves a baseband radio interface controller such a BRIC™ which is a specific trademarked CPRI device that forms a baseband radio interface controller offered by PMC-Sierra, Inc. of Santa Clara, Calif., USA. Such one-chip embodiment in a named BRIC™ is shown in FIG. 23.

The BRIC™ is a full-featured 6-port termination device that fully supports the CPRI specification for wireless base station interconnection. The BRIC™ provides integrated rate-adaptive SERDES links along with CPRI framing, mapping, switching, and combining functions so as to flexibly create scalable CPRI-compliant distributed architectures.

In terms of an overview of the CPRI link receiver, the BRIC™ supports per link programmable rates in the receive direction. It implements a Data and Clock Recovery Unit (DCRU) in the SERDES subsystem to recover clock and data. The SERDES then performs serial-to-parallel conversion, and sends raw 8B/10B encoded data to the Radio Frame Demapper (RDMP). The RDMP performs 8B/10B decoding and delineates received frames. It optionally unpacks basic frames into IQ samples and control words. The RDMP optionally performs frame alignment using an IQ data FIFO. It sends IQ samples after frame alignment to the Crossbar with Summing (XCSUM) for AxC switching and summing. Optionally, the RDMP bypasses the XCSUM and sends received basic frames with or without IQ unpacking directly to the Radio Bus Interface (RBI). The RDMP forwards Slow and Fast C&M control words to the Control & Management Processor (CMP).

In terms of an overview of the CPRI link transmitter, the BRIC™ supports per link programmable rates in the transmit direction. The BRIC™ implements a Radio Frame Mapper (RMAP) to pack IQ samples per antenna carrier from the RBI and control words from the CMP/RBI into CPRI basic frames. Optionally, IQ samples to the RMAP can be switched from another link through the XCSUM. The RMAP then performs 8B/10B encoding and sends the encoded data to the SERDES subsystem for transmission over the serial link.

In terms of an overview of the CPRI cross connect, the BRIC™ provides a Crossbar with Summing (XCSUM) for CPRI Antenna Carrier Container (AxC) switching and IQ summing. It also supports AxC multicast after summing. A prerequisite for AxC switching and IQ summing is to align CPRI basic frames from multiple links in order to avoid cross connect contention. This is achieved through the IQ data FIFO within the RDMP of each link. For CPRI, AxC switching is Time-Division-Multiplexing (TDM) based. The BRIC™ provides two independent 6×6 summing crossbars, one for uplinks and the other for downlinks. Their TDM switching tables are maintained in the XCSUM. The BRIC™ also supports a link protection switching mode. In this mode, the BRIC™ can switch traffic between working and protection link without data corruption.

In terms of an overview of CPRI control and management message processing, the BRIC™ supports simultaneous Slow and Fast C&M message transmission on the same link. Here, C&M messages received from a serial link are defined as drop C&M messages, and C&M messages to be transmitted into a serial link are defined as add C&M messages. For Fast C&M messages received from a serial link, the RDMP forwards them to the Control and Management Processor (CMP). The CMP performs 4B/5B decoding and Physical Coding Sublayer (PCS) framing. It provides a buffer space of two maximum-sized Ethernet frames of 1518 bytes (for non-tagged frames; it is 1522 bytes for tagged frames), and works in store and forward mode. The CMP outputs the resulting Ethernet frames to an external Ethernet MAC device through the RMII/SMII/MII interface. For Fast C&M messages received on the RMII/SMII/MII interface, the CMP performs PCS encapsulation, and optionally carries out flow control as defined by 802.3ah. It provides a buffer space of one maximum-sized Ethernet frame of 1518 bytes for non-tagged frames, or 1522 bytes for tagged frames, and works in either store and forward mode or cut-through mode. The CMP sends the resulting Ethernet frames to the RMAP for insertion into CPRI basic frames. When the RDMP receives slow C&M messages from a serial link, it forwards them to the Control and Management Processor (CMP). The CMP relays the slow C&M messages to the Synchronization and Channelized HDLC Processor (SCHP). The SCHP performs HDLC framing and bit de-stuffing. It provides a buffer space of 1K bytes per link with programmable threshold, and works in cut-through mode. The SCHP sends the resulting HDLC frames to registers accessible through the Microprocessor Interface (MPIF). Optionally, the SCHP sends received raw HDLC frames to the channelized HDLC interface. For HDLC frames received from the MPIF, the SCHP performs HDLC encapsulation. It provides a buffer space of 1K bytes per link with programmable threshold, and works in cut-through mode. Optionally, the SCHP accepts encapsulated HDLC frames directly from the channelized HDLC interface. The SCHP sends the resulting slow C&M messages to the associated CMP, where the CMP forwards the slow C&M message to the associated RMAP for insertion into CPRI basic frames.

In terms of an overview of CPRI link rate auto negotiation a link's RMAP is responsible for initiating rate auto negotiation when acting as a link master. The RMAP provides a software configurable bit vector for available link rates. Once enabled by software, the RMAP cycles through all available link rates from high to low to determine the link rates supported by the far-end. The RMAP reports each available link rate under consideration to the RDMP for CPRI framing Once the RDMP has reached the HFNSYNC state, it flags an interrupt, and the link rate auto-negotiation is completed. When acting as a link slave, a link's RDMP and RMAP participate in link rate auto negotiation by trying to synchronize to the far-end link master. The steps in the synchronization process are similar to those for a link master with the exception that the RMAP does not start transmitting data until the RDMP has reached the HFNSYNC state.

The BRIC™ supports delay measurement and supports delay calibration in accordance with the present invention with high accuracy. Inventive delay measurement is accomplished through a delay calculator as described hereinabove. The delay calculator implements a distributed architecture up to 32 end points. It supports delay measurement among any two end points with high accuracy. It also supports delay measurement through in-service SERDES' through a spare SERDES. Inventive delay calibration is accomplished through the delay calibrator as described hereinabove so as to provide accurate delay measurement for transmitter diversity or on-chip FIFO crossing asynchronous clock domain. The measurement results are used by RMAP and RDMP to remove delay uncertainty.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for measuring a delay in a distributed wireless system, said method comprising:
   detecting a group of frame pulses;
   selecting two reference frame pulses from the group of frame pulses;
   performing a state-machine based coarse grain measurement using a coarse grain finite state machine to obtain a coarse grain delay between said two reference frame pulses;
   performing a state-machine based fine grain measurement using a fine grain finite state machine to obtain a phase offset between said two reference frame pulses, and holding the coarse grain finite state machine in a WAIT state whenever a fine grain measurement is underway;
   calculating a total delay between said two reference frame pulses using said coarse grain delay and said phase offset;
   wherein said total delay corresponds to said delay in said distributed wireless system; and further comprising the sequential steps of:
   a. storing a first delay line tap setting corresponding to a first rising edge of a clock signal associated with the first selected reference frame pulse;
   b. storing a second delay line tap setting corresponding to a first rising edge of a clock signal associated with the second selected reference frame pulse; and
   c. storing a third delay line tap setting corresponding to the next rising edge of the clock signal associated with the first selected reference frame pulse.

2. The measuring method as claimed in claim 1, wherein said group of frame pulses co-exist on a device within said distributed wireless system.

3. The measuring method as claimed in claim 2, wherein said device is a serializer-deserializer (SERDES) device.

4. The measuring method as claimed in claim 3, wherein said SERDES device is embodied within a single integrated circuit package, said single integrated circuit package being selected from a group consisting of: an application specific integrated circuit, a field programmable gate array, and a baseband radio interface controller.

5. The measuring method as claimed in claim 4, wherein at least one spare SERDES device exists and said two reference frame pulses are provided from said at least one spare SERDES device such that said delay is measured without intruding on in-service SERDES traffic.

6. The measuring method as claimed in claim 3, wherein said total delay is used to further perform calculation of an amount of delay introduced by receive logic of said SERDES device.

7. The measuring method as claimed in claim 3, wherein said performing fine grain measurement step uses a delay line provided with a shared high speed clock.

8. The measuring method as claimed in claim 2, wherein said total delay is used to further perform calculation of round trip delay between a transmit end point and a receive endpoint within said distributed wireless system.

9. The measuring method of claim 1, wherein detecting the reference frame pulses comprises detecting each reference frame pulse on both the rising and falling edge of the delay line clock.

10. An apparatus for measuring a delay in a distributed wireless system, said apparatus comprising:

a first set of frame pulse and phase detectors (FPPDs) for obtaining a first reference frame pulse;
a second set of FPPDs for obtaining a second reference frame pulse;
a delay line coupled to, and shared among, said first and second sets of FPPDs;
a coarse grain finite state machine coupled to each said FPPD to perform a state machine-based coarse grain measurement and obtain a coarse grain delay between said first and said second reference frame pulses;
a fine grain finite state machine coupled to each said FPPD and said delay line to perform a state machine-based fine grain measurement and obtain a phase offset between said first and said second reference frame pulses;
wherein the coarse grain finite state machine is held in a WAIT state whenever the fine grain measurement is underway;
wherein said delay in said distributed wireless system is determined by said fine grain finite state machine in conjunction with said coarse grain finite state machine; and further comprising:
  a. a first storage element for storing a first delay line tap setting corresponding to a first rising edge of a clock signal associated with the first selected reference frame pulse;
  b. a second storage element for storing a second delay line tap setting corresponding to a first rising edge of a clock signal associated with the second selected reference frame pulse; and
  c. a third storage element for storing a third delay line tap setting corresponding to the next rising edge of the clock signal associated with the first selected reference frame pulse.

11. The measuring apparatus as claimed in claim 10, wherein each said FPPD includes:
  a phase detection circuit coupled to said delay line and said fine grain finite state machine, and
  a frame pulse detection circuit coupled to said coarse grain finite state machine.

12. The measuring apparatus as claimed in claim 11, wherein said delay line is constructed with standard digital logic.

13. The measuring apparatus as claimed in claim 12, wherein said standard digital logic includes a series of buffers arranged to provide a delayed output.

14. The measuring apparatus as claimed in claim 12, wherein said delay line is provided with an input from a shared system clock.

15. The measuring apparatus as claimed in claim 14, wherein said shared system clock is a high speed clock formed by a ring oscillator.

16. The measuring apparatus as claimed in claim 15, wherein said apparatus is embodied within a single integrated circuit package, said single integrated circuit package being selected from a group consisting of: an application specific integrated circuit, a field programmable gate array, and a baseband radio interface controller.

17. The measuring apparatus of claim 10, wherein each of the frame pulse and phase detectors further comprises a frame pulse detection circuit for detecting each frame pulse on both the rising and falling edge of a delay line clock.

18. A method of compensating for delay in a distributed wireless system, said method comprising:
  calculating a FIFO delay introduced by a first-in-first-out (FIFO) circuit used in a datapath between a writer clocked by a write clock and a reader clocked by a read clock, said calculating of said FIFO delay including
    detecting a group of FIFO frame pulses,
    selecting a write frame pulse and a read frame pulse from the group of FIFO frame pulses,
    performing state-machine based coarse grain measurement using a coarse grain finite state machine to obtain a coarse grain delay between said write and read frame pulses,
    performing state-machine based fine grain measurement using a fine grain finite state machine to obtain a phase offset between said write and read frame pulses, and holding the coarse grain finite state machine in a WAIT state whenever a fine grain measurement is underway;
    calculating said FIFO delay between said write and read frame pulses using said coarse grain delay and said phase offset;
  upon reaching a predetermined threshold of said FIFO delay, stalling subsequent read frame pulses of said FIFO by a fixed increment of read clock cycle(s) corresponding to said FIFO delay; and further comprising the sequential steps of:
    a. storing a first delay line tap setting corresponding to a first rising edge of a clock signal associated with the first selected reference frame pulse;
    b. storing a second delay line tap setting corresponding to a first rising edge of a clock signal associated with the second selected reference frame pulse; and
    c. storing a third delay line tap setting corresponding to the next rising edge of the clock signal associated with the first selected reference frame pulse.

19. The compensating method as claimed in claim 18, wherein said stalling step is accomplished by way of a barrel shifter.

20. The compensating method as claimed in claim 19, wherein said fixed increment is one read clock cycle and said predetermined threshold is three read clock cycles.

21. The measuring method of claim 18, wherein detecting the FIFO frame pulses comprises detecting each FIFO frame pulse on both the rising and falling edge of the delay line clock.

22. An apparatus for delay compensation in a distributed wireless system, said apparatus comprising:
  a first-in-first-out (FIFO) circuit used in a datapath between a writer and a reader;
  a first set of frame pulse and phase detectors (FPPDs) for obtaining a write frame pulse;
  a second set of FPPDs for obtaining a read frame pulse;
  a delay line coupled to, and shared among, said first and second sets of FPPDs;
  a coarse grain finite state machine coupled to each said FPPD to perform a state machine-based coarse grain measurement and obtain a coarse grain delay between said write and read frame pulses;
  a fine grain finite state machine coupled to each said FPPD and said delay line to perform a state machine-based fine grain measurement and obtain a phase offset between said write and read frame pulses, where FIFO delay is determined by said fine grain finite state machine in conjunction with said coarse grain finite state machine;
  wherein the coarse grain finite state machine is held in a WAIT state whenever the fine grain measurement is underway;
  each said FPPD including a phase detection circuit coupled to said delay line and said fine grain finite state machine, and a frame pulse detection circuit coupled to said coarse grain finite state machine;

a pulse generator for stalling subsequent read frame pulses of said FIFO by a fixed increment corresponding to said FIFO delay upon reaching a predetermined threshold of said FIFO delay; and further comprising:
  a. a first storage element for storing a first delay line tab setting corresponding to a first rising edge of a clock signal associated with the first selected reference frame pulse;
  b. a second storage element for storing a second delay line tap setting corresponding to a first rising edge of a clock signal associated with the second selected reference frame pulse; and
  c. a third storage element for storing a third delay line tab setting corresponding to the next rising edge of the clock signal associated with the first selected reference frame pulse.

23. The delay compensation apparatus as claimed in claim 22, further comprising a barrel shifter to stall said subsequent read frames.

24. The compensating apparatus of claim 22, wherein the frame pulse detection circuit detects each frame pulse on both the rising and falling edge of a delay line clock.

* * * * *

UNITED STATES PATENT AND TRADEMARK OFFICE
CERTIFICATE OF CORRECTION

| | | |
|---|---|---|
| PATENT NO. | : 7,940,667 B1 | Page 1 of 1 |
| APPLICATION NO. | : 11/829403 | |
| DATED | : May 10, 2011 | |
| INVENTOR(S) | : Alan Coady et al. | |

It is certified that error appears in the above-identified patent and that said Letters Patent is hereby corrected as shown below:

Column 23, line 5, claim 22, delete "line tab" and insert therefor -- line tap --;

Column 24, line 1, claim 22, delete "line tab" and insert therefor -- line tap --.

Signed and Sealed this
Fifth Day of July, 2011

David J. Kappos
*Director of the United States Patent and Trademark Office*